(12) United States Patent
Silk et al.

(10) Patent No.: US 7,511,705 B2
(45) Date of Patent: Mar. 31, 2009

(54) POSITION SENSOR

(75) Inventors: Christopher J. Silk, Cambridge (GB); David T. E. Ely, Cambridge (GB); Andrew Errington, Cambridge (GB); Ian Collins, Cambridge (GB); Geoffrey Foote, Cambridge (GB); Julian Haines, Cambridge (GB); Robert J. Bolender, Davis, CA (US); Gareth J. McCaughan, Cambridge (GB)

(73) Assignee: Synaptics (UK) Limited, Cambridge (GB)

( * ) Notice: Subject to any disclaimer, the term of this patent is extended or adjusted under 35 U.S.C. 154(b) by 695 days.

(21) Appl. No.: 10/478,354

(22) PCT Filed: May 21, 2002

(86) PCT No.: PCT/GB02/02387

§ 371 (c)(1), (2), (4) Date: May 6, 2004

(87) PCT Pub. No.: WO02/103622

PCT Pub. Date: Dec. 27, 2002

(65) Prior Publication Data

US 2004/0233178 A1    Nov. 25, 2004

(30) Foreign Application Priority Data

May 21, 2001 (GB) .................................. 0112332.2
Mar. 5, 2002 (GB) .................................. 0205116.7

(51) Int. Cl.
G09G 5/00 (2006.01)

(52) U.S. Cl. ...................................................... 345/179
(58) Field of Classification Search .................. 345/179
See application file for complete search history.

(56) References Cited

U.S. PATENT DOCUMENTS

| 2,145,742 A | 1/1939 | Wechsung |
| 2,867,783 A | 1/1959 | Childs |
| 2,942,212 A | 6/1960 | Mynall |
| 3,219,956 A | 11/1965 | Newell et al. |
| 3,297,940 A | 1/1967 | Mulligan et al. |

(Continued)

FOREIGN PATENT DOCUMENTS

DE           1134848           8/1962

(Continued)

OTHER PUBLICATIONS

International Search Report for International Patent Application No. PCT/GB02/05247 dated May 23, 2005.

(Continued)

*Primary Examiner*—Bipin Shalwala
*Assistant Examiner*—Afroza Y Chowdhury
(74) *Attorney, Agent, or Firm*—Nixon & Vanderhye PC

(57) ABSTRACT

A low cost x-y digitizing system is described for use in consumer electronic devices, such as portable digital assistants, mobile telephones, web browsers and the like. The digitizer includes a resonant stylus, an excitation winding for energizing the resonant stylus and a set of sensor windings for sensing the signal generated by the stylus, from which the x-y position of the stylus is determined. A novel stylus design is described together with novel digitizer windings and novel excitation and processing circuitry.

18 Claims, 26 Drawing Sheets

U.S. PATENT DOCUMENTS

| | | |
|---|---|---|
| 3,482,242 A | 12/1969 | Hargrove |
| 3,647,963 A | 3/1972 | Bailey |
| 3,772,587 A | 11/1973 | Ferrand et al. |
| 3,812,481 A | 5/1974 | Stednitz |
| 3,851,242 A | 11/1974 | Ellis |
| 3,873,770 A | 3/1975 | Ioannou |
| 3,895,356 A | 7/1975 | Kraus |
| 3,898,635 A | 8/1975 | Kulterman |
| 3,906,436 A | 9/1975 | Kurauchi et al. |
| 3,962,663 A | 6/1976 | Visser |
| 4,005,396 A | 1/1977 | Fujiwara et al. |
| 4,014,015 A | 3/1977 | Gundlach |
| 4,065,850 A | 1/1978 | Burr et al. |
| 4,081,603 A | 3/1978 | Davis et al. |
| 4,092,852 A | 6/1978 | Fowler et al. |
| 4,094,572 A | 6/1978 | Burr et al. |
| 4,097,684 A | 6/1978 | Burr |
| 4,150,352 A | 4/1979 | Pomella et al. |
| 4,156,192 A | 5/1979 | Schedrovitsky et al. |
| 4,210,775 A | 7/1980 | Rodgers et al. |
| 4,223,300 A | 9/1980 | Wiklund |
| 4,255,617 A | 3/1981 | Carau, Sr. et al. |
| 4,341,385 A | 7/1982 | Doyle et al. |
| 4,358,723 A | 11/1982 | Scholl et al. |
| 4,387,509 A | 6/1983 | Dechelette |
| 4,423,286 A | 12/1983 | Bergeron |
| 4,425,511 A | 1/1984 | Borsh |
| 4,482,784 A | 11/1984 | Whetstone |
| 4,504,832 A | 3/1985 | Conte |
| 4,507,638 A | 3/1985 | Brosh |
| 4,532,376 A | 7/1985 | Rockwell |
| 4,577,057 A | 3/1986 | Blesser |
| 4,577,058 A | 3/1986 | Collins |
| 4,593,245 A | 6/1986 | Vierti et al. |
| 4,609,776 A | 9/1986 | Murakami et al. |
| 4,642,321 A | 2/1987 | Schoenberg et al. |
| 4,667,182 A * | 5/1987 | Murphy .................. 340/407.2 |
| 4,672,154 A | 6/1987 | Rodgers et al. |
| 4,686,501 A | 8/1987 | Palmier et al. |
| 4,693,778 A | 9/1987 | Swiggett et al. |
| 4,697,050 A | 9/1987 | Farel et al. |
| 4,697,144 A | 9/1987 | Howbrook |
| 4,697,244 A | 9/1987 | Murakami et al. |
| 4,704,501 A | 11/1987 | Taguchi et al. |
| 4,709,209 A | 11/1987 | Murakami et al. |
| 4,711,026 A | 12/1987 | Swiggett et al. |
| 4,711,977 A | 12/1987 | Miyamori et al. |
| 4,723,446 A | 2/1988 | Saito et al. |
| 4,734,546 A | 3/1988 | Landmeier |
| 4,737,698 A | 4/1988 | McMullin et al. |
| 4,748,295 A | 5/1988 | Rogers |
| 4,752,655 A | 6/1988 | Tajiri et al. |
| 4,786,765 A | 11/1988 | Yamanami et al. |
| 4,820,961 A | 4/1989 | McMullin |
| 4,821,002 A | 4/1989 | Luly |
| 4,848,496 A | 7/1989 | Murakami et al. |
| 4,868,443 A | 9/1989 | Rossi |
| 4,878,553 A | 11/1989 | Yamanami et al. |
| 4,891,590 A | 1/1990 | Hammel et al. |
| 4,893,077 A | 1/1990 | Auchterlonie |
| 4,902,858 A | 2/1990 | Yamanami et al. |
| 4,963,703 A | 10/1990 | Phillips |
| 4,975,546 A | 12/1990 | Craig |
| 4,985,691 A | 1/1991 | Pulyer et al. |
| 4,988,837 A | 1/1991 | Murakami et al. |
| 4,999,461 A | 3/1991 | Murakami et al. |
| 5,004,872 A | 4/1991 | Lasley |
| 5,013,047 A | 5/1991 | Schwab |
| 5,023,408 A | 6/1991 | Murakami et al. |
| 5,028,745 A | 7/1991 | Yamanami et al. |
| 5,041,785 A | 8/1991 | Bogaerts et al. |
| 5,045,645 A | 9/1991 | Hoendervoogt et al. |
| 5,059,180 A | 10/1991 | McLees |
| 5,066,833 A | 11/1991 | Zalenski |
| 5,082,286 A | 1/1992 | Ryan et al. |
| 5,088,928 A | 2/1992 | Chan |
| 5,122,623 A | 6/1992 | Zank et al. |
| 5,129,654 A | 7/1992 | Bogner |
| 5,134,388 A | 7/1992 | Murakami et al. |
| 5,134,689 A | 7/1992 | Murakami et al. |
| 5,136,125 A | 8/1992 | Russell |
| 5,177,389 A | 1/1993 | Schalk |
| 5,188,368 A | 2/1993 | Ryan |
| 5,206,785 A * | 4/1993 | Hukashima .............. 361/283.2 |
| 5,218,174 A | 6/1993 | Gray et al. |
| 5,225,637 A | 7/1993 | Rodgers et al. |
| 5,239,489 A | 8/1993 | Russell |
| 5,245,336 A | 9/1993 | Chen et al. |
| 5,247,137 A | 9/1993 | Epperson |
| 5,247,138 A | 9/1993 | Landmeier |
| 5,274,198 A | 12/1993 | Landmeier |
| 5,342,136 A | 8/1994 | Fukami |
| 5,349,139 A | 9/1994 | Verrier et al. |
| 5,357,062 A | 10/1994 | Rockwell et al. |
| 5,369,227 A | 11/1994 | Stone |
| 5,381,091 A | 1/1995 | Kobayashi et al. |
| 5,396,443 A | 3/1995 | Mese et al. |
| 5,406,155 A | 4/1995 | Persson |
| 5,434,372 A | 7/1995 | Lin |
| 5,461,204 A * | 10/1995 | Makinwa et al. ......... 178/19.03 |
| 5,486,731 A | 1/1996 | Masaki et al. |
| 5,525,981 A | 6/1996 | Abernethy |
| 5,554,827 A | 9/1996 | Oda |
| 5,557,076 A | 9/1996 | Wieczorek et al. |
| 5,565,632 A * | 10/1996 | Ogawa .................... 73/862.69 |
| 5,571,997 A | 11/1996 | Gray et al. |
| 5,576,502 A * | 11/1996 | Fukushima et al. ...... 73/862.68 |
| 5,600,105 A | 2/1997 | Fukuzaki et al. |
| 5,619,431 A | 4/1997 | Oda |
| 5,625,239 A | 4/1997 | Persson et al. |
| 5,635,683 A | 6/1997 | McDermott et al. |
| 5,646,496 A | 7/1997 | Woodland et al. |
| 5,657,011 A | 8/1997 | Komatsu et al. |
| 5,691,513 A | 11/1997 | Yamamoto et al. |
| 5,691,748 A | 11/1997 | Fukuzaki |
| 5,693,913 A | 12/1997 | Sudo et al. |
| 5,693,993 A | 12/1997 | Ito et al. |
| 5,748,110 A | 5/1998 | Sekizawa |
| 5,751,229 A | 5/1998 | Funahashi |
| 5,783,940 A | 7/1998 | Kolomeitsev |
| 5,815,091 A | 9/1998 | Dames |
| 5,818,091 A | 10/1998 | Lee et al. |
| 5,818,431 A | 10/1998 | Oh et al. |
| 5,826,473 A | 10/1998 | Saka et al. |
| 5,854,449 A | 12/1998 | Adkins |
| 5,864,098 A | 1/1999 | Shinohe |
| 5,866,847 A | 2/1999 | Saka et al. |
| 5,895,895 A | 4/1999 | Ono et al. |
| 5,914,735 A | 6/1999 | Yamamoto et al. |
| 5,943,044 A | 8/1999 | Martinelli et al. |
| 6,002,387 A | 12/1999 | Ronkka et al. |
| 6,005,555 A | 12/1999 | Katsurahira et al. |
| 6,124,708 A | 9/2000 | Dames |
| 6,236,199 B1 | 5/2001 | Irle et al. |
| 6,239,789 B1 | 5/2001 | Sekizawa et al. |
| 6,249,135 B1 | 6/2001 | Maruyama et al. |
| 6,249,234 B1 | 6/2001 | Ely et al. |
| 6,249,235 B1 | 6/2001 | Iwasaki |
| 6,255,810 B1 | 7/2001 | Irle et al. |
| 6,262,684 B1 | 7/2001 | Stewart et al. |
| 6,288,710 B1 | 9/2001 | Lee et al. |
| 6,304,014 B1 | 10/2001 | England et al. |
| 6,304,076 B1 | 10/2001 | Madni et al. |
| 6,489,899 B1 | 12/2002 | Ely et al. |

| | | | |
|---|---|---|---|
| 6,513,943 B2 | 2/2003 | Fukuyoshi | |
| 6,522,128 B1 | 2/2003 | Ely et al. | |
| 6,534,970 B1 | 3/2003 | Ely et al. | |
| 6,667,704 B1 * | 12/2003 | Grale et al. | 341/123 |
| 6,667,740 B2 * | 12/2003 | Ely et al. | 345/179 |
| 6,705,511 B1 | 3/2004 | Dames et al. | |
| 6,727,439 B2 * | 4/2004 | Chao et al. | 178/19.01 |
| 6,788,221 B1 | 9/2004 | Ely et al. | |
| 6,797,895 B2 | 9/2004 | Lapstun et al. | |
| 6,798,404 B2 | 9/2004 | Sharma | |
| 6,888,538 B2 * | 5/2005 | Ely et al. | 345/173 |
| 2001/0001430 A1 | 5/2001 | Ely et al. | |
| 2001/0006369 A1 | 7/2001 | Ely | |
| 2002/0179339 A1 * | 12/2002 | Ely et al. | 178/18.07 |
| 2004/0233178 A1 * | 11/2004 | Silk et al. | 345/179 |

FOREIGN PATENT DOCUMENTS

| | | |
|---|---|---|
| DE | 3500121 | 7/1986 |
| DE | 3620412 | 12/1987 |
| EP | 0182085 A2 | 5/1986 |
| EP | 0182085 A3 | 5/1986 |
| EP | 0209513 A1 | 6/1986 |
| EP | 0218745 | 4/1987 |
| EP | 0 307 667 | 3/1989 |
| EP | 0313046 | 4/1989 |
| EP | 0 499 641 | 8/1992 |
| EP | 0 511 406 | 11/1992 |
| EP | 0537458 | 4/1993 |
| EP | 0552001 A1 | 7/1993 |
| EP | 0554900 | 8/1993 |
| EP | 0607694 A1 | 7/1994 |
| EP | 0657917 A1 | 6/1995 |
| EP | 0 672 997 | 9/1995 |
| EP | 0675581 A1 | 10/1995 |
| EP | 0680009 | 11/1995 |
| EP | 0680009 A2 | 11/1995 |
| EP | 0709648 A2 | 5/1996 |
| EP | 0716390 | 6/1996 |
| EP | 0743508 | 11/1996 |
| EP | 0772149 | 5/1997 |
| FR | 1325017 | 4/1963 |
| FR | 2298082 | 8/1976 |
| FR | 2682760 | 4/1993 |
| GB | 851543 | 10/1960 |
| GB | 1122763 | 8/1968 |
| GB | 1452132 | 10/1976 |
| GB | 2012431 A | 7/1979 |
| GB | 2021273 A | 11/1979 |
| GB | 2042183 A | 9/1980 |
| GB | 2059593 A | 4/1981 |
| GB | 2064125 A | 6/1981 |
| GB | 2074736 A | 11/1981 |
| GB | 1604824 | 12/1981 |
| GB | 2103943 A | 3/1983 |
| GB | 2141235 A | 12/1984 |
| JP | 63-211014 A | 9/1988 |
| JP | 02-248816 | 10/1990 |
| JP | 406051905 A | 2/1994 |
| WO | 92/12401 | 7/1992 |
| WO | 94/25829 | 11/1994 |
| WO | 95/31696 | 11/1995 |
| WO | 96/03188 A1 | 2/1996 |
| WO | 97/14935 | 4/1997 |
| WO | 98/00921 | 1/1998 |
| WO | 98/54545 | 12/1998 |
| WO | 98/58237 A | 12/1998 |
| WO | 99/34171 | 7/1999 |
| WO | 00/33244 A | 6/2000 |

OTHER PUBLICATIONS

International Search Report for International Patent Application No. PCT/GB02/02387 dated Jan. 8, 2004.
British Examination Report for British Patent Application No. GB0422091.9 dated Jun. 1, 2005.
"Physics 2CL Lab Manual" Online! 1999, XP002327778, Retrieved from the Internet: URL:http://hep.ucsd.edu/dbmacf/1998-1999/2cl/manual/experiment3.pdf, Retrieved on May 11, 2005, pp. 51-61.
Patent Abstracts of Japan, vol. 010, No. 009, (P-420), Jan. 14, 1986 & JP 60 165512 A (Toshiba KK), Aug. 28, 1985.
Klatt, "Phase of Digital Data Fixes Shaft Angle", Electrical Design News, vol. 16, No. 12, Jun. 15, 1971, pp. 53-56. XP002045871.
Patent Abstracts of Japan, vol. 15, No. 37 (P-1159), Jan. 29, 1991 & JP 02 275314 A (Omron Tateisi Electron Co), Nov. 9, 1990.
Patent Abstracts of Japan, vol. 10, No. 32 (E-379), Feb. 7, 1986 & JP 60 189231 A (Matsushita Denki Sangyo KK) Sep. 26, 1985.
Pulle et al., "A New Magnetoresistive Based Sensor for Switched Reluctance Drives", Proceedings of the Annual Power Electronics Specialists Conference (PECS), Toledo, Jun. 29-Jul. 3, 1992, vol. 2, No. CONF. 23, Jun. 29, 1992, pp. 839-843, Institute of Electrical and Electronics Engineers.
Search Report for UK Application No. GB0416614.6 dated Oct. 22, 2004.
Search Report for PCT Application No. PCT/GB 99/03989 (published as WO 00/33244 A3) dated Aug. 23, 2000.
Search Report for PCT Application No. PCT/GB 03/02432 (published as WO 2003/105072 A3) dated May 11, 2004.
McDonnel, "The Use of Inductosyn to Digital Converters in Linear Control Systems", Automation, vol. 10, No. 11-12, Nov. 1975-Dec. 1975, pp. 31-32.
Electronics Letters, vol. 11, No. 1, Jan. 9, 1975, pp. 5-6, Gordon, "Digital xy Position Indicator Using Walsh Functions".

* cited by examiner

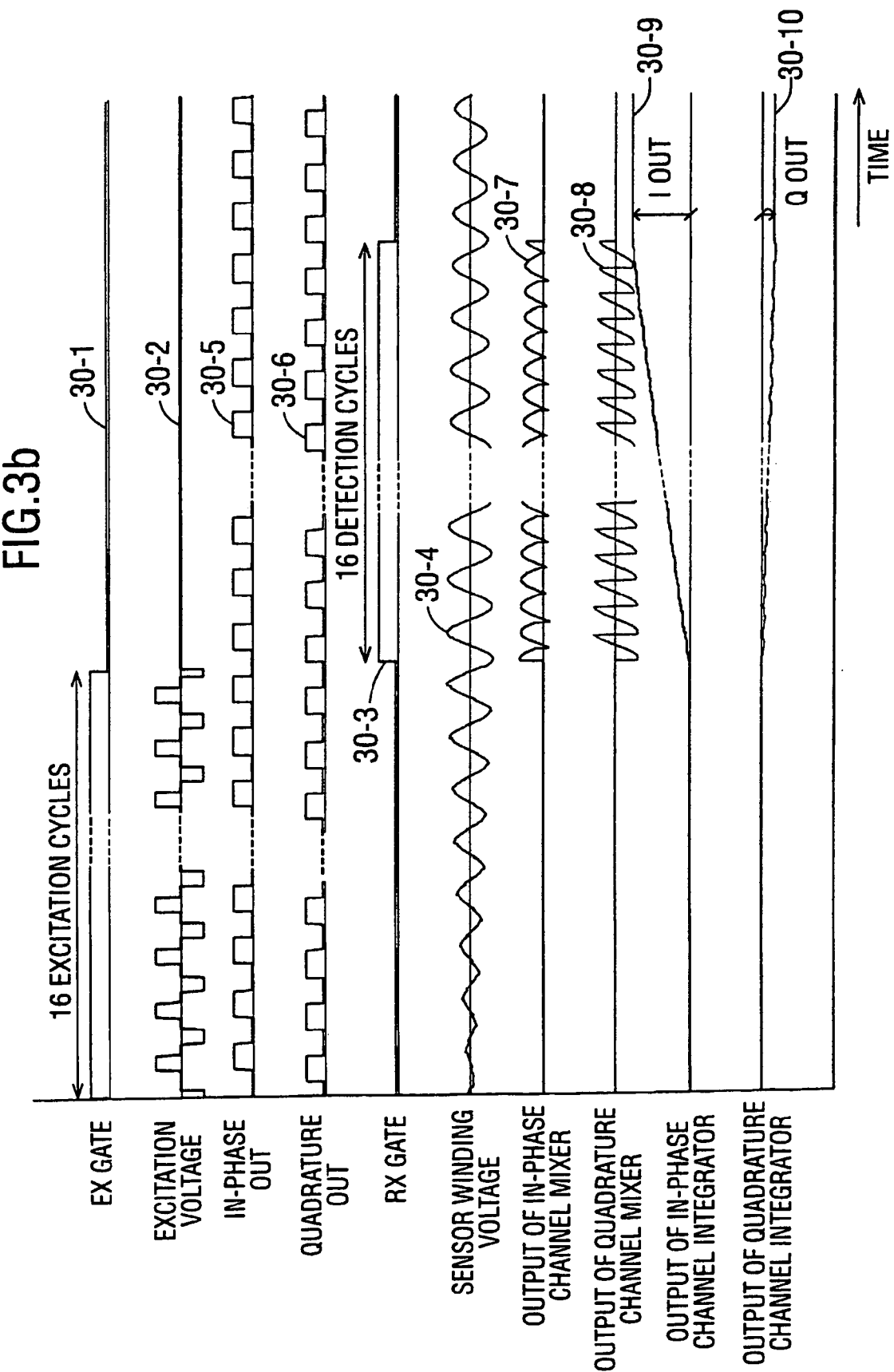

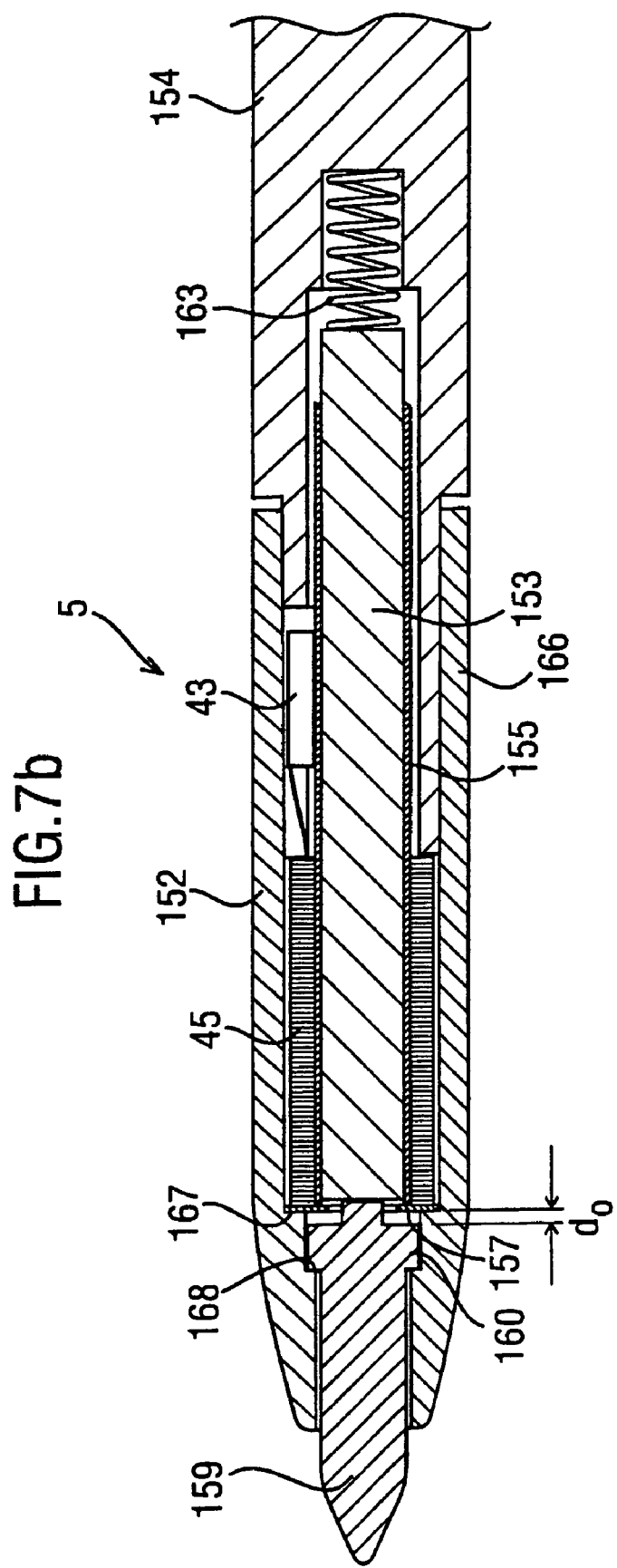

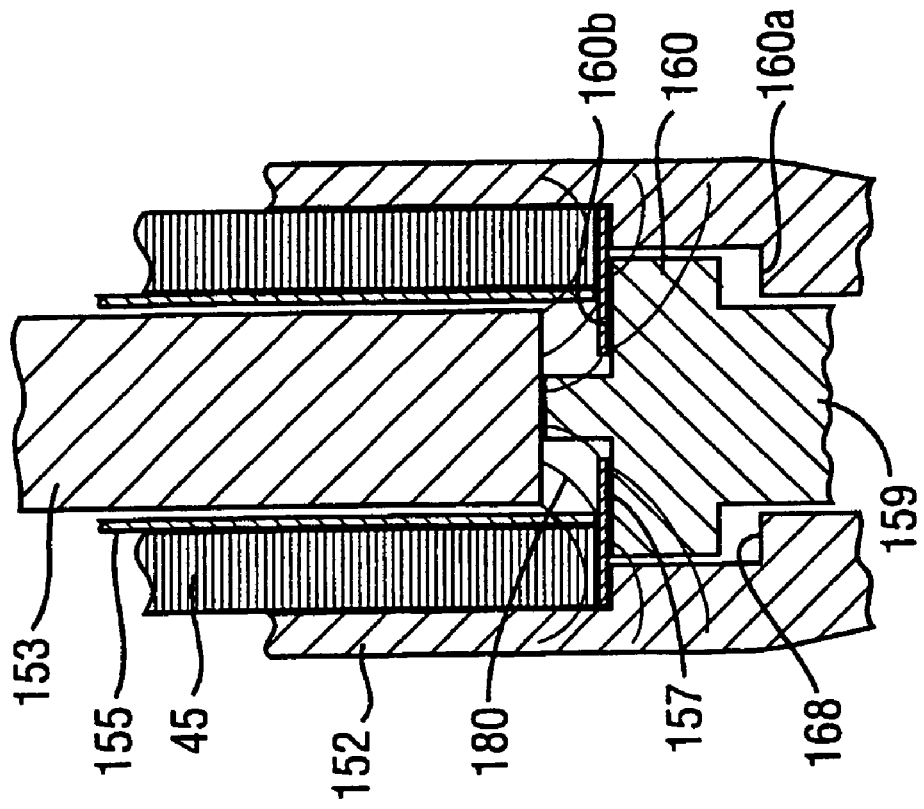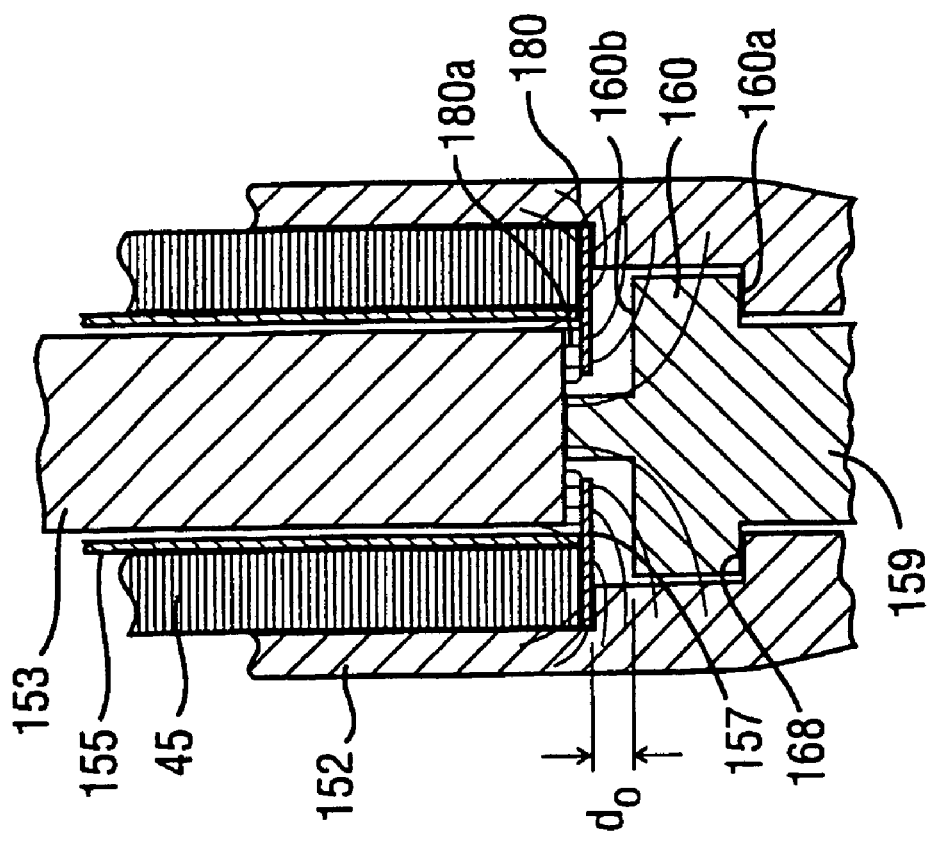

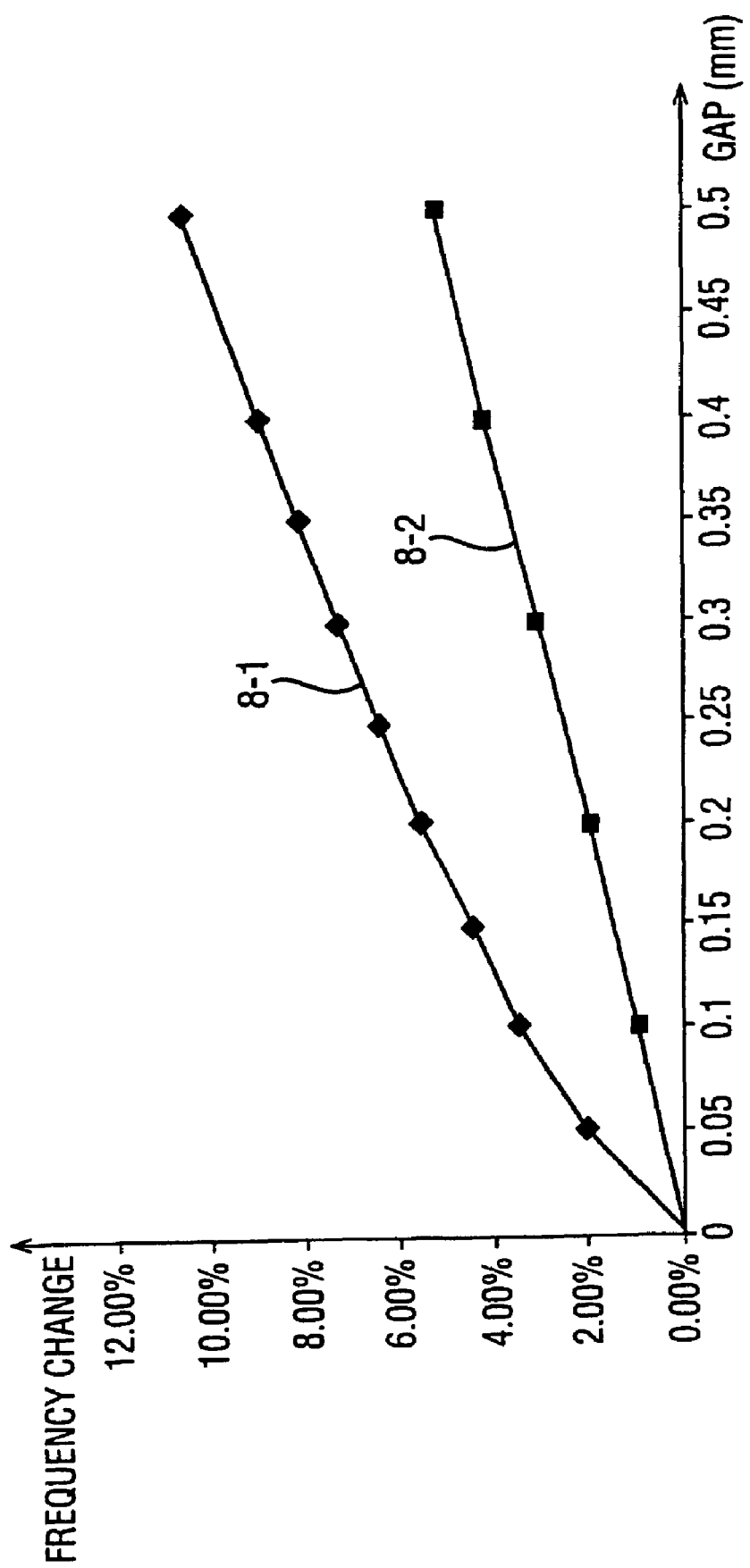

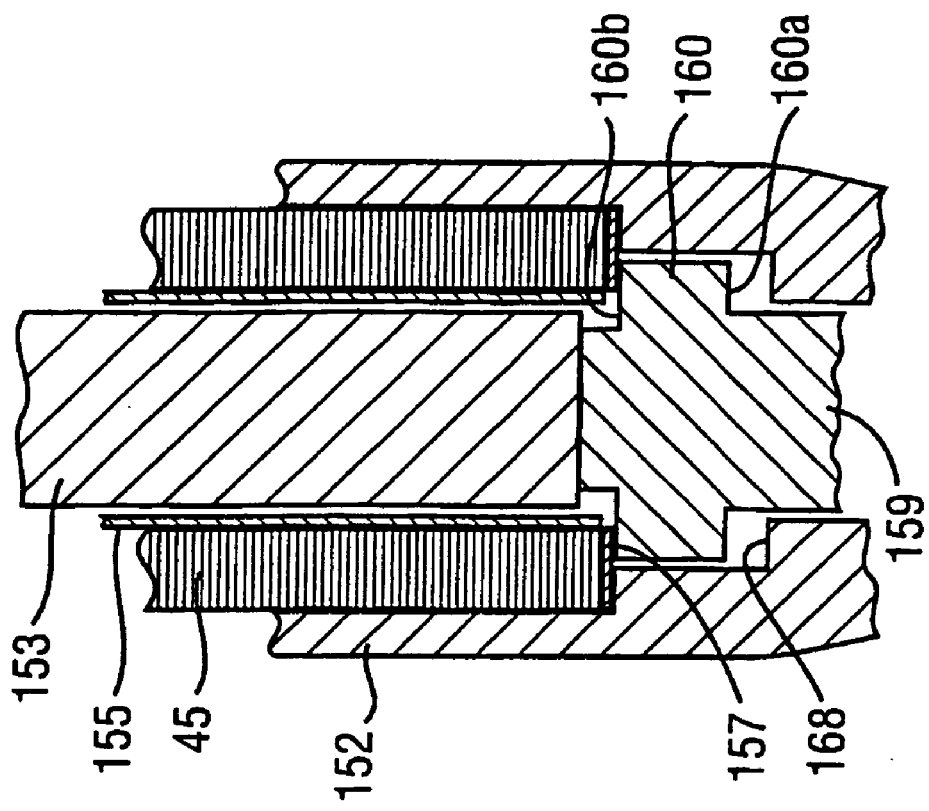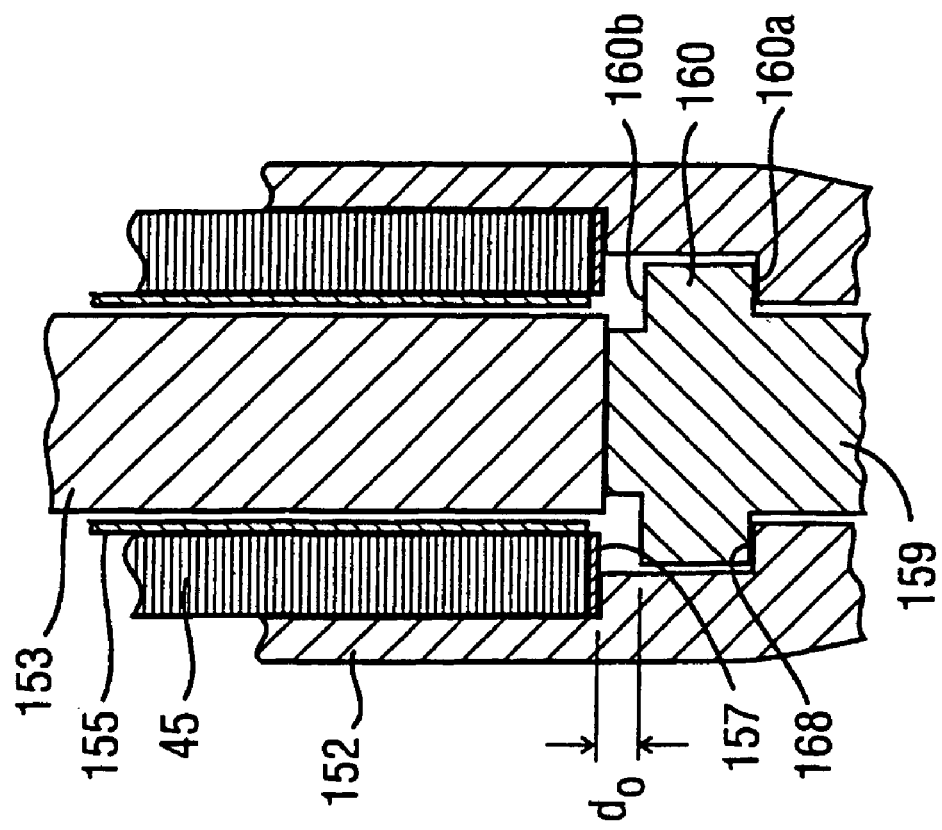

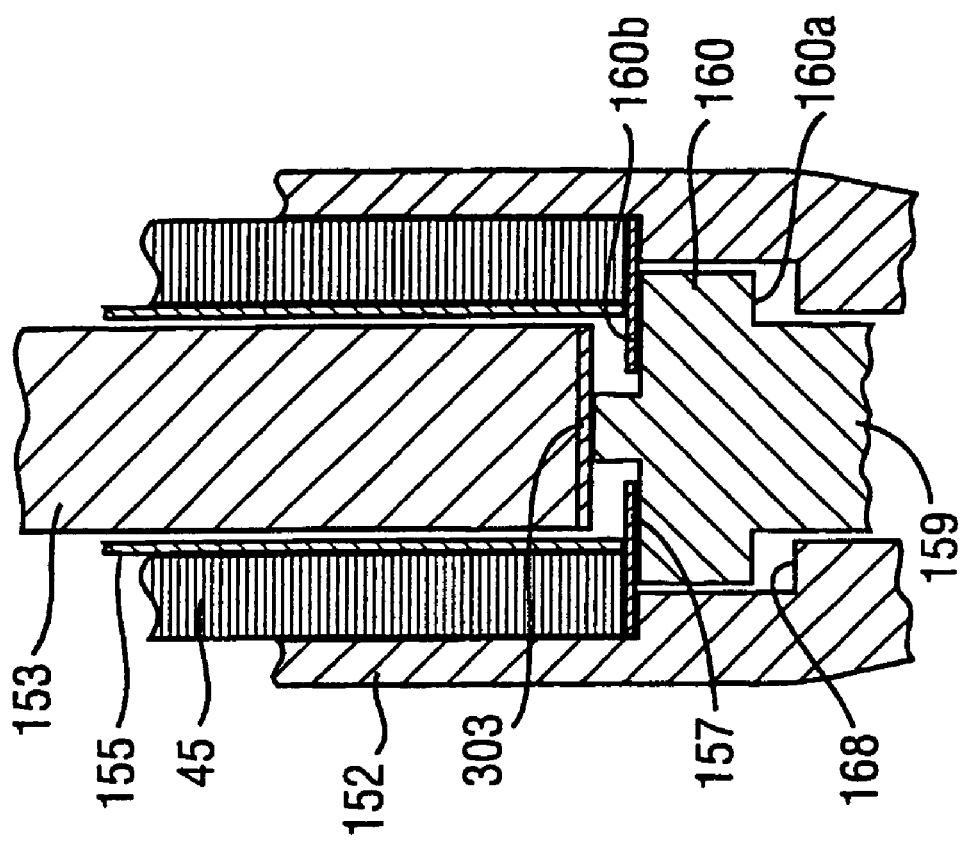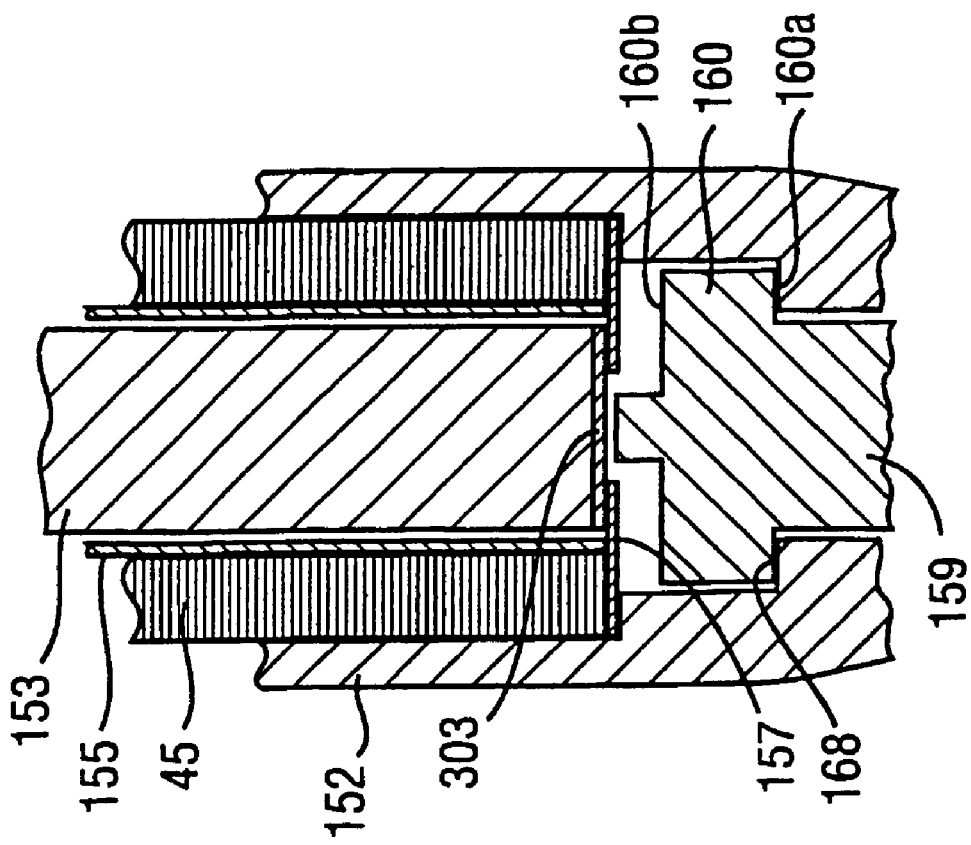

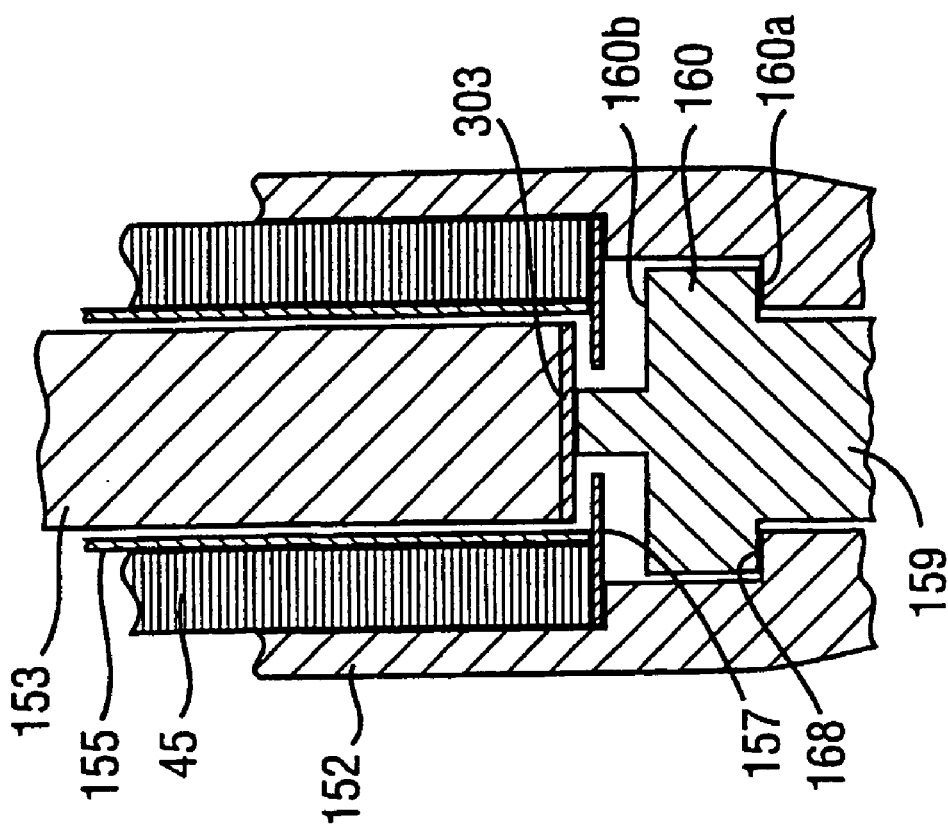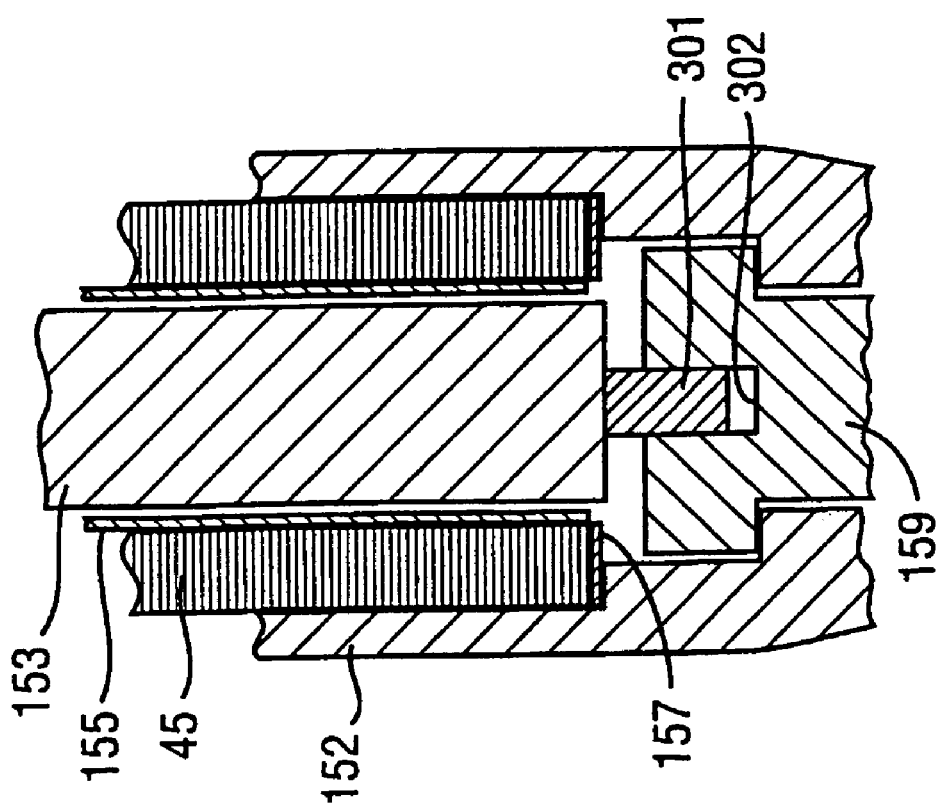

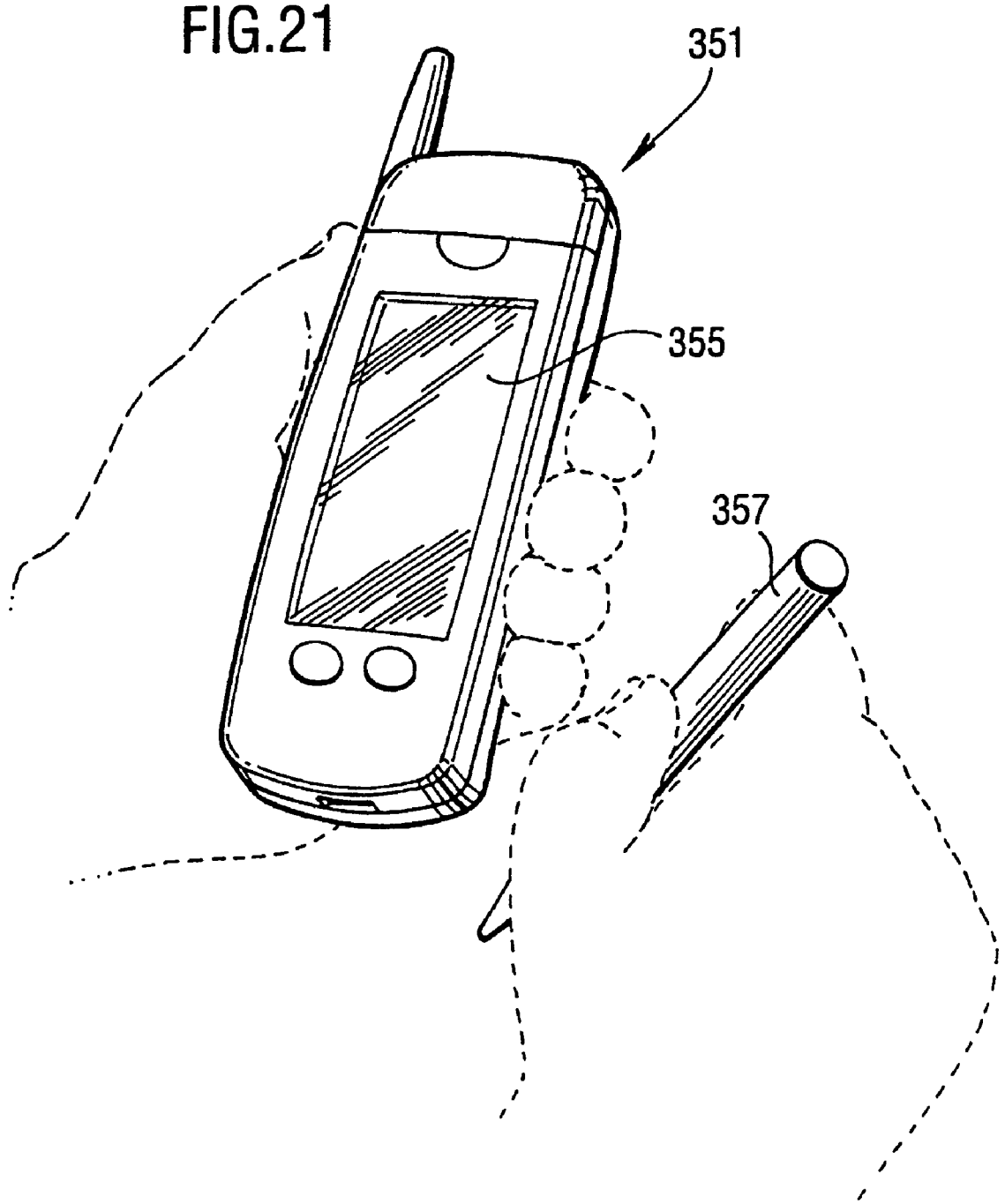

POSITION SENSOR

RELATED APPLICATIONS

This application is the U.S. national phase of international application PCT/GB 02/02387 filed May 21, 2002, which designated the U.S.

BACKGROUND

1. Technical Field

The present invention relates to a position sensor and to parts therefor. The invention has particular although not exclusive relevance to stylus input computer and communication devices, particularly small, low cost devices, such as personal digital assistants (PDAS), mobile telephones, web browsers and combinations of these. The invention has particular relevance where those computer and communication devices are battery powered.

2. Related Art

Several pen or stylus sensing systems for computer input exist. For example, U.S. Pat. No. 4,878,553 and the applicant's earlier International application WO 00/33244 describe inductive stylus position sensing systems which allow for handwriting input, menu selection and other similar applications.

In WO 00/33244, processing electronics in the computer device generates an AC current, which is fed to an excitation coil in a sensor board of the device. This current generates an AC magnetic field that can couple with a coil in the stylus. A capacitor is also provided in the stylus connected in parallel with the coil to form a resonator. The magnetic field from the sensor board forces the resonator in the stylus to resonate. When the AC current is removed from the excitation coil, the resonator continues to resonate, with the amplitude of the oscillation decaying exponentially with time. This generates similar decaying EMFs in sensor coils on the sensor board, which are processed by processing electronics to provide a position indication of the stylus relative to the computer device.

In order to mimic the action of a conventional pen, the system described in WO 00/33244 also detects when the electronic stylus is pressed against a writing surface of the device by arranging the stylus so that the stylus resonator's frequency varies as a function of pressure applied to the nib of the stylus. The processing electronics in the device can then detect the resonator frequency in order to infer the nib pressure. In most PDA and similar applications, only a "clicked" or "unclicked". (i.e. stylus touching the writing surface or not touching the writing surface respectively) indication of nib pressure is required.

In WO 00/33244, the position processor normally operates with a fixed excitation frequency which it uses to excite the resonator in the stylus. The position processor then detects the electrical phase of the return signal in order to infer the pen resonator frequency. The electronic stylus described in this earlier International application is designed to provide a well-defined difference between the clicked and unclicked frequency (hereinafter the click-shift frequency). However, the absolute value of those frequencies is variable between styluses and the amount of variability may typically be greater than the click-shift frequency. As a result, a single measurement of the resonant frequency of the stylus may be insufficient to determine whether it is clicked or unclicked.

One possible solution to determine click status is to perform a special tuning step before the stylus can be used normally, such as requiring the user to put the stylus into a known state (for example in the clicked state by touching the stylus against the writing surface) and to store the resonant frequency of the stylus in this state. In subsequent normal operation the stylus state is reported as clicked if the resonator frequency is measured close to the previously stored value and not clicked if the difference is greater than a predetermined threshold. However, such a tuning technique has the drawback that it requires cooperation from the user. Ideally, if tuning is to be performed, it should be done in a manner that is transparent to the user.

Another solution to this problem would be for the position processor to continuously track the position of the stylus in order to predict when the stylus is in a particular state, at which point its frequency is measured and used as a reference. However, such prediction is difficult and for low-powered devices (such as hand-held battery-powered devices) requires excessive power to be drawn from the battery if the stylus is to be tracked continuously. Further, without continuous tracking, it is difficult to detect the condition where a user swaps between two styluses with different frequencies (which might occur if several styluses are provided each associated with a different function, such as writing and erasing).

Another problem associated with the stylus design described in WO 00/33244 is that the resonant frequency of the stylus can reduce significantly if the stylus is rested flat on the writing surface, due to magnetic screening used behind the sensor board of the hand-held device. In this case, the processor may erroneously report that the stylus has been clicked.

Some of these problems would be overcome in the stylus described in WO 00/33244 by simply increasing the click-shift frequency. However, with the design of stylus described in WO 00/33244, this would require significant movement of the nib of the stylus between the clicked and unclicked states which would feel unacceptably large for users.

BRIEF SUMMARY

According to one aspect, the present invention provides a system which does not require a special tuning step. The stylus is designed so that its unclicked resonant frequency will always lie within a predefined "unclicked frequency band" and so that its clicked resonant frequency will always lie within a "clicked frequency band". The processing electronics then measures the frequency of the stylus and reports clicked if that measurement exceeds the decision frequency and unclicked if it is lower than the decision frequency. In the preferred embodiment, this is achieved whilst maintaining a relatively small nib-click distance (i.e. the distance the nib has to move between the clicked and unclicked states) so that the writing action of the stylus is similar to that of a conventional pen.

In an alternative embodiment, the stylus design may be arranged so that the frequency shifts in a downward direction when pressure is applied to the nib. However, an increase in frequency is preferred so that a stylus resting on the writing surface is not reported as being clicked due to significant resonant frequency reduction caused by the screening material used in the sensor board.

In a preferred embodiment, the styluses are designed so that their clicked and unclicked frequencies lie within a "free space clicked resonant frequency band" and "free space unclicked resonant frequency band" that are narrower than the "clicked frequency band" and "unclicked frequency band" discussed above, so that the resonant frequency of the stylus can change over time with changes in temperate and due to the proximity of the stylus to conductive or magnetically permeable objects.

In the main embodiment described below, a new stylus is described which can operate in the above manner. Further, a new set of digitiser windings are described which are preferably used with the stylus. A novel two-stage measurement process is also described for measuring the resonant frequency of the stylus and for determining the position of the stylus relative to the digitising tablet.

BRIEF DESCRIPTION OF THE DRAWINGS

Various other aspects of the present invention will become apparent from the following detailed description of a preferred embodiment in which:

FIG. 3b is a timing plot illustrating the form of various signals within the x-y digitising system shown in FIG. 3a during an excitation and receive cycle;

FIG. 7b is a cross-sectional view of the resonant stylus shown in FIG. 1;

FIG. 8a is a cross-sectional view of part of the resonant stylus shown in FIG. 7b in an unclicked state, illustrating the positional relationship between a nib, a ferrite core and a coil forming part of the resonant stylus and showing magnetic field lies passing from the ferrite core around the coil in the unclicked state;

FIG. 8b is a cross-sectional view of part of the resonant stylus shown in FIG. 7b in a clicked state showing the positional relationship between the nib, ferrite core and coil of the resonant stylus and showing magnetic field lines passing from the ferrite core around the coil in the clicked state;

FIG. 9 is a plot illustrating the percentage frequency change of the resonant frequency with gap between the ferrite rod and the split washer;

FIG. 12 is a block diagram illustrating the functional modules forming part of a digital processing and signal generation unit forming part of the excitation and processing electronics shown in FIG. 3a;

FIG. 14a is a partial cross-sectional view illustrating an alternative arrangement of the stylus in an unclicked state;

FIG. 14b is a partial cross-sectional view of the stylus shown in FIG. 14a in the clicked state;

FIG. 15a is a partial cross-sectional view of an alternative stylus in an unclicked state;

FIG. 15b is a partial cross-sectional view illustrating the stylus shown in FIG. 15a in the clicked state;

FIG. 16 is a partial cross-sectional view of an alternative stylus whose resonant frequency can be varied at the time of manufacture using an adjustable pin;

FIG. 17 is a partial cross-sectional view of another alternative stylus whose resonant frequency can be varied at the time of manufacture using a spacer having a selected thickness;

FIG. 21 is a perspective view showing a mobile telephone having a liquid crystal display and a digitising system under the display which is operable to sense the position of a resonant stylus relative to the display.

DETAILED DESCRIPTION OF EXEMPLARY EMBODIMENT

Overview of Digitising System

Figure 1:
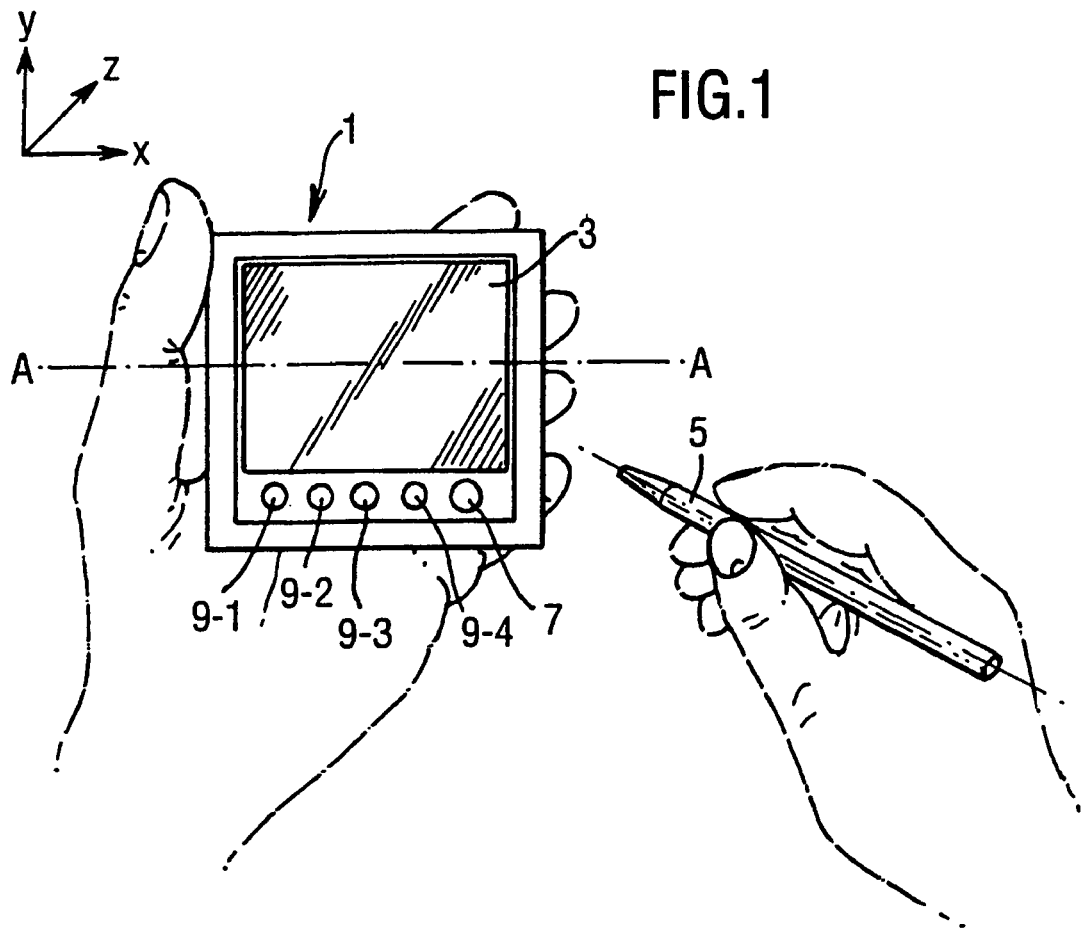
FIG. 1 is a schematic view of a hand-held personal digital assistant (PDA) which includes an x-y digitising system located behind the PDA's liquid crystal display which can sense the (x,y) position of a resonant stylus.

FIG. 1 shows a hand-held battery-powered personal digital assistant (PDA) 1 which employs an x-y digitising system (not shown) which is located beneath a liquid crystal display 3 of the PDA 1. The x-y digitising system is operable to detect the presence and x-y position of a resonant stylus 5 relative to the LCD 3. The position signals output from the digitising system are used by the PDA 1 to control information that is displayed on the LCD 3 and to control the operating function of the PDA 1. As shown, the PDA 1 also includes a number of push buttons beneath the LCD 3 including an on-off button 7 and a number of control buttons 9-1 to 9-4 which are used to control different functions of the PDA 1.

Figure 2:
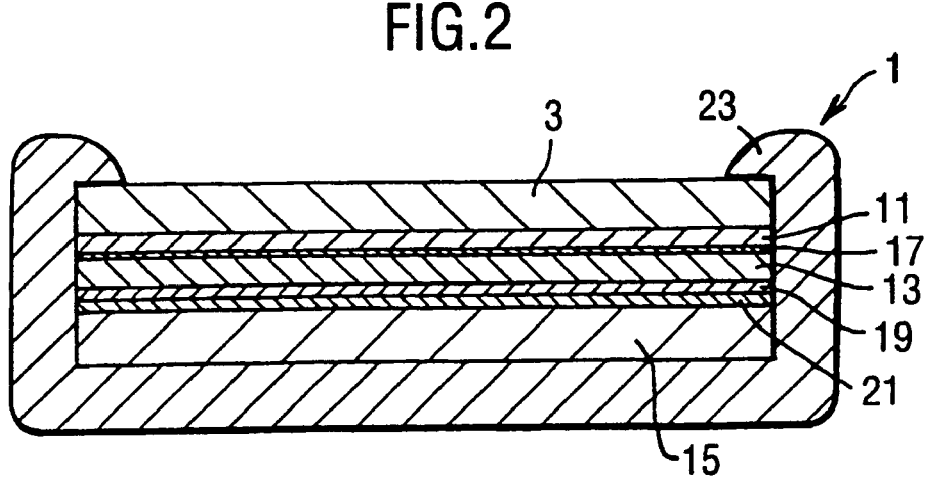
FIG. 2 schematically illustrates a cross-sectional view of the personal digital assistant shown in FIG. 1, illustrating the positional relationship between a sensor printed circuit board of the digitising system and the liquid crystal display.

FIG. 2 shows a cross-sectional view on A-A of the PDA 1 shown in FIG. 1. As shown, the PDA 1 includes a liquid crystal display 3 which, in this embodiment, is between 1.5 mm and 3 mm thick. Beneath the LCD 3, there is an electroluminescent backlight 11 for providing a backlight for the LCD 3. In this embodiment, this backlight layer 11 has a thickness of approximately 150 μm. Beneath these layers, there is a 0.2 mm thick sensor printed circuit board (PCB) 13 which forms part of the above-mentioned x-y digitising system. This sensor PCB 13 carries the excitation winding and the sensor windings used for sending signals to and receiving signals from the resonant stylus 5. Beneath the sensor PCB 13 there is a printed circuit board 15 which carries the electronics for controlling the functions of the PDA and the digitiser electronics for processing the signals received from and controlling the signals sent to the windings on the sensor PCB 13.

As shown in FIG. 2, in this embodiment, a grounded electrostatic screen 17 is provided between the sensor printed circuit board 13 and the electroluminescent backlight 11 in order to reduce noise from the liquid crystal display 3 and the backlight 11 from interfering with the x-y digitising system. In this embodiment, this electrostatic screen is formed from a continuous layer of carbon ink which is approximately 10 μm thick and has a relatively high surface resistivity (e.g. >1 ohm per square) so that it does not interfere with the magnetic sensing function. Further, as shown in FIG. 2, beneath the sensor PCB 13 is a 50 μm layer of pressure sensitive adhesive 19 for bonding the sensor PCB 13 onto a magnetic screen 21, which in this embodiment is a 25 μm layer of spin melt ribbon (for example Vitrovac 6018 manufactured by Vacuumschmelze, Hanau, Germany). As those skilled in the art will appreciate, the magnetic screen 21 is provided in order to reduce any disturbance which may be caused to the x-y digitising system by, for example, the electronics behind the sensor PCB 13. It also enhances the sensitivity of the x-y digitising system since it provides a permeable path for magnetic flux to pass behind the sensor windings on the sensor PCB 13. As shown in FIG. 2, encasing these layers and providing mechanical support is an outer casing 23 which is made, in this embodiment, from plastic.

Figure 3A:
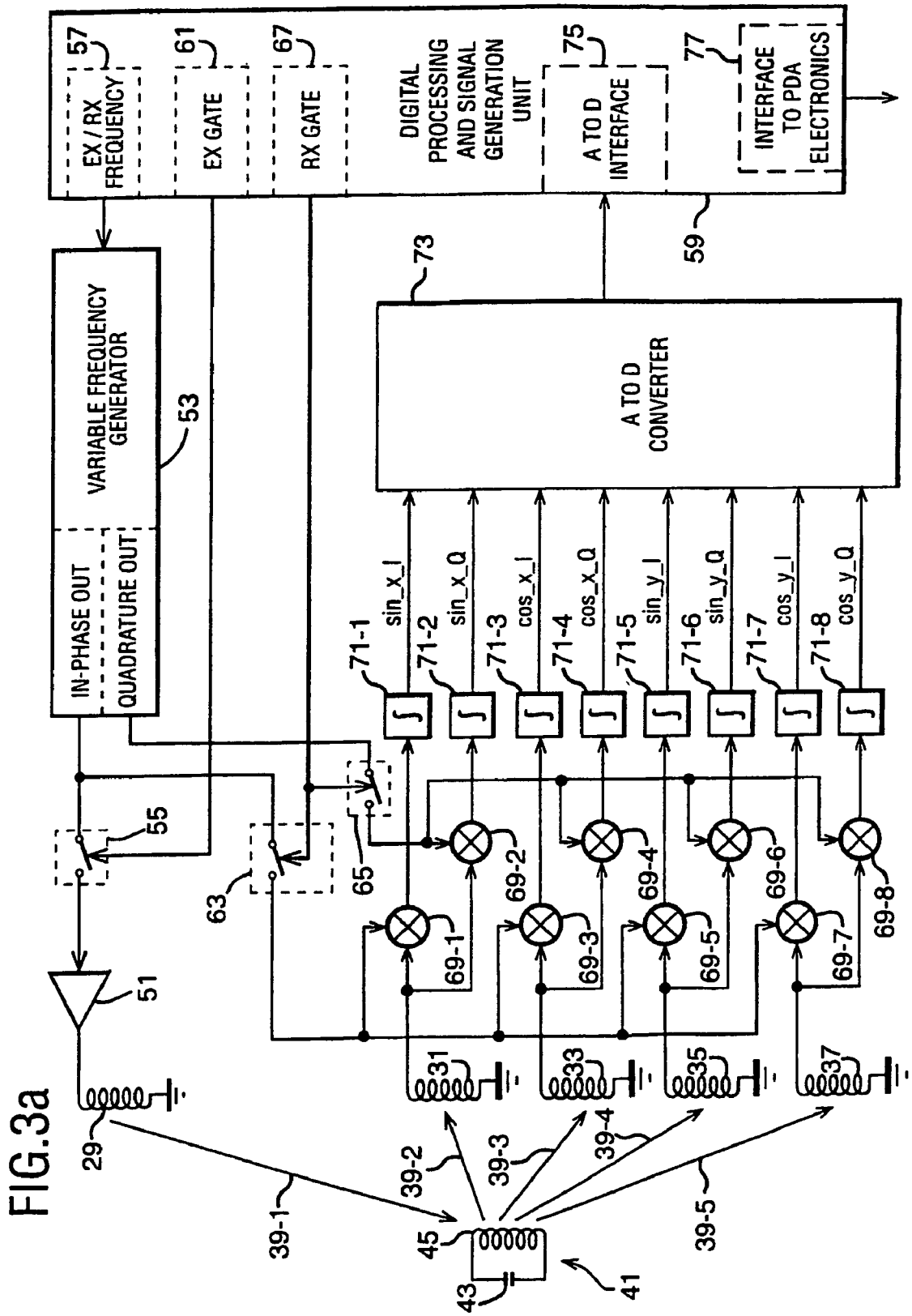
FIG. 3a is a schematic functional block diagram illustrating the excitation and processing electronics of the x-y digitising system and illustrating the magnetic coupling between an excitation winding of the digitising system and the resonant stylus and the magnetic coupling between the resonant stylus and four sensor windings which form part of the digitising system.

FIG. 3a schematically illustrates a functional block diagram of the digitising system's processing electronics and FIG. 3b illustrates some of the signals in the digitising system during an excitation and receive cycle. FIG. 3a also illustrates the way in which the excitation winding and the sensor windings interact with the resonant stylus 5. In particular, FIG. 3 schematically shows an excitation winding 29, two x-sensor windings 31 and 33 for sensing x position and two y-sensor windings 35 and 37 for sensing y position. Each of these windings is formed by printed conductors on the sensor PCB 13. As will be explained in more detail below, the sensor windings 31, 33, 35 and 37 used in this embodiment are periodic and are in spatial phase quadrature relative to each other. Therefore, in the following description x-sensor winding 31 will be referred to as the sin x sensor winding, x-sensor 33 will be referred to as the cos x sensor winding, y-sensor winding 35 will be referred to as the sin y sensor winding and y-sensor winding 37 will be referred to as the cos y sensor winding. As illustrated by the arrows 39, these windings are operable, in use, to couple magnetically with a resonant circuit 41 (comprising a capacitor 43 and an inductor coil 45) in the resonant stylus 5.

In operation, an excitation current is applied to the excitation winding 29 through an excitation driver 51. In this embodiment, the excitation current comprises a sequence of positive and negative pulses having a fundamental frequency component ($F_0$) of approximately 100 kHz, which is approximately the resonant frequency of the resonant circuit 41. This excitation signal is generated by a variable frequency generator 53 which generates an appropriate excitation voltage which is applied to the excitation driver 51 through a switch 55. In this embodiment, the frequency of the excitation voltage generated by the generator 53 is set by an excitation/receive frequency control circuit 57 which forms part of a digital processing and signal generation unit 59. As those skilled in the art will appreciate, by using such a variable frequency generator 53, the digitising system can be reconfigured to operate with a stylus having a different resonant frequency.

The excitation current flowing in the excitation winding 29 generates a corresponding electromagnetic field which magnetically couples, as indicated by the arrow 39-1, with the resonant circuit 41 and causes it to resonate. In this embodiment, the excitation winding 29 is arranged to keep the coupling with the resonator as constant as possible with the x-y position of the stylus relative to the LCD 3. When the resonator 41 is resonating, it generates its own electromagnetic field which magnetically couples, as represented by the arrows 39-2, 39-3, 39-4 and 39-5, with the sensor windings 31, 33, 35 and 37 respectively. As will be explained in more detail below, the sensor windings 31, 33, 35 and 37 are designed so that the coupling between them and the resonant stylus varies with the x or y position of the stylus and so that there is minimum direct coupling between them and the excitation winding 29. Therefore, the signal received in the sensor windings should only vary with the magnetic coupling between the resonator 41 and the respective sensor winding. Consequently, by suitable processing of the signals received in the sensor windings, the x-y position of the resonator 41, and hence of the resonant stylus 5, can be determined relative to the sensor windings.

In this embodiment, the excitation current is not continuously applied to the excitation winding 29. Instead, bursts of the excitation current are applied, with the application of the excitation bursts being controlled by opening and closing the switch 55. As shown in FIG. 3a, this is controlled by an excitation gate controller 61 which forms part of the digital processing and signal generation unit 59. In this embodiment, in order to reduce the effect of any breakthrough from the excitation winding 29 to the sensor windings, the signals induced in the sensor windings are only detected between the bursts of the excitation current. This is achieved by controlling the positions of switches 63 and 65 with the receive gate controller 67 which forms part of the digital processing and signal generation unit 59. This mode of operation is referred to as pulse echo and works because the resonator 41 continues to resonate after the burst of excitation current has ended. This mode of operation also minimises power consumption of the digitiser.

FIG. 3b shows the excitation gate signal 30-1 applied to the switch 55; the excitation voltage 30-2 applied to the excitation winding 29; the receive gate signal 30-3 applied to the switches 63 and 65 and a typical voltage 30-4 induced in one of the sensor windings. In this illustration, sixteen excitation cycles (counting the start and end pulses as halves) are applied to the excitation winding 29 which energises the resonator 41 in the stylus 5 which in turn induces a signal such as 30-4 in each of the sensor windings. As a result of the periodic nature of the sensor windings and their relative positions, the four signals induced in the four sensor windings from the resonant circuit 41 can be approximated by:

$$E_{31} = Ae^{-t/\tau}\sin\left[\frac{2\pi x}{L_x}\right]\cos[2\pi F_o t + \emptyset] \quad (1)$$

$$E_{33} = Ae^{-t/\tau}\cos\left[\frac{2\pi x}{L_x}\right]\cos[2\pi F_o t + \emptyset] \quad (2)$$

$$E_{35} = Ae^{-t/\tau}\sin\left[\frac{2\pi y}{L_y}\right]\cos[2\pi F_o t + \emptyset] \quad (3)$$

$$E_{37} = Ae^{-t/\tau}\cos\left[\frac{2\pi y}{L_y}\right]\cos[2\pi F_o t + \emptyset] \quad (4)$$

where A is a coupling coefficient which depends upon, among other things, the distance of the stylus 5 from the windings and the number of turns in the sensor windings; x is the x-position of the resonant stylus relative to the sensor windings; y is the y-position of the resonant stylus relative to the sensor windings; $L_x$ is a spatial wavelength of the sensor windings in the x-direction and is typically slightly greater than the width of the board in the x-direction (and in this embodiment is 97 mm); $L_y$ is a spatial wavelength of the sensor windings in the y-direction and is typically slighter greater than the width of the board in the y-direction (and in this embodiment is 87 mm); $e^{-t/\tau}$ is the exponential decay of the resonator signal after the burst of excitation signal has ended, with $\tau$ being a resonator constant which depends upon, among other things, the quality factor of the resonant circuit 41; and ø is an electrical phase shift caused by a difference between the fundamental frequency of the excitation current and the resonant frequency of the resonator 41. In this embodiment, the resonant stylus 5 is designed so that its resonant frequency changes with the pressure applied to the tip of the stylus. This change in frequency causes a change in the phase shift ø.

As can be seen from equations (1) to (4), the peak amplitude of the signals induced in the sensor windings vary as the sin or cos of either the x or y position.

Figure 4A:
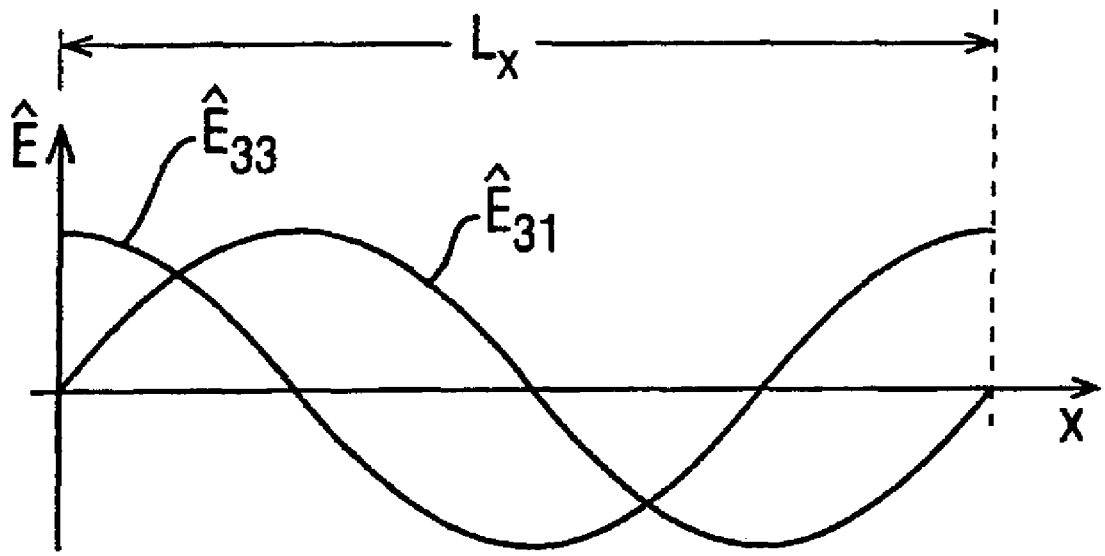
FIG. 4a schematically illustrates an approximation of the way in which the peak amplitude of the signals induced in x-sensor windings of the digitising system vary with the x-coordinate of the position of the stylus relative to the liquid crystal display.
Figure 4B:
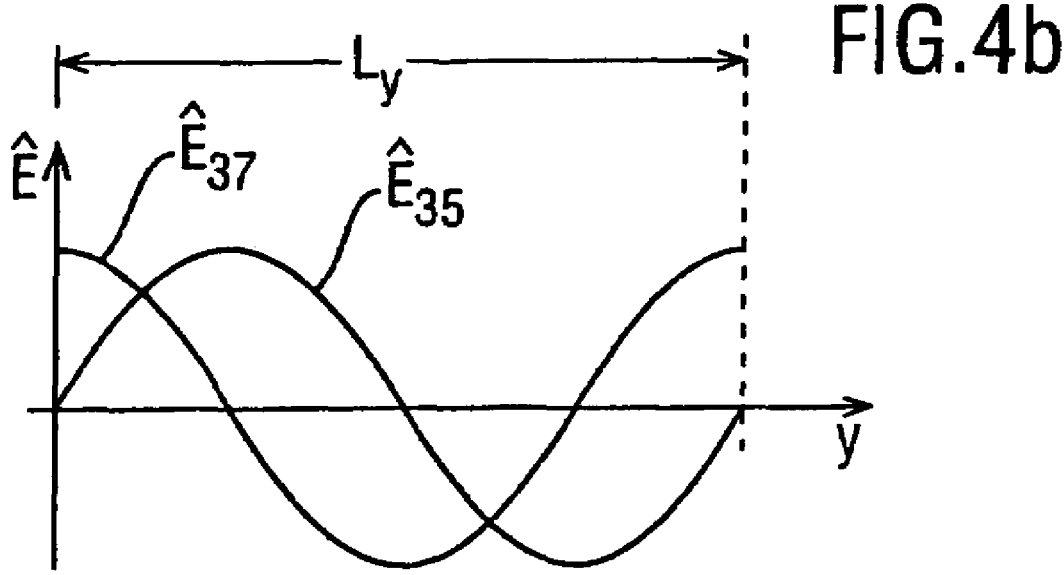
FIG. 4b schematically illustrates an approximation of the way in which the peak amplitude of the signals induced in y-sensor windings of the digitising system vary with the y-coordinate of the position of the stylus relative to the liquid crystal display.

This is illustrated in FIGS. 4a and 4b. In particular, FIG. 4a illustrates the way in which the peak amplitude of the signal induced in sensor winding 31 and the way in which the signal induced in sensor winding 33 varies with the x-position of the resonant stylus relative to the sensor windings and FIG. 4b shows the way in which the peak amplitude of the signals induced in sensor winding 35 and sensor winding 37 vary with the y-position of the resonant stylus relative to the sensor windings. As shown in FIG. 4, the pitch ($L_x$) of the windings in the x-direction is greater than the pitch ($L_y$) of the windings in the y-direction. This is because, in this embodiment, the measurement area is rectangular.

Therefore, as those skilled in the art will appreciate, both the x-y position information of the resonant stylus 5 and the phase shift ø can be determined from the signals induced in the sensor windings by suitable demodulation and processing. As shown in FIG. 3a, this demodulation is achieved by mixing the received signals with the excitation voltage generated by the variable frequency generator 53 in the mixers 69-1 to 69-8. In this embodiment, an in-phase component 30-5 and a quadrature phase component 30-6 (shown in FIG. 3b) of the excitation signal are mixed with the signal induced in each of the sensor windings. This generates an in phase (I) component 30-7 and a quadrature phase (Q) component 30-8 of each of the demodulated signals. In this embodiment, the in phase components 30-7 of the demodulated signals from all the sensor windings are used to determine the position information and the in phase and quadrature phase components of the demodulated signals are used to determine the electrical phase shift (i.e. ø). As shown in FIG. 3a, the output from these mixers 69 are input to a respective integrator 71-1 to 71-8 which, after being reset, integrate the outputs from the mixers over a time period which is a multiple of $1/F_0$ (in order to remove the effect of the time varying components output by the mixer). In this embodiment, the integration time is controlled by using the receive gate signal 30-3 (which in the illustration allows for the integration to be performed over sixteen excitation periods or cycles). The following equations approximate the outputs from the integrators 71-1 to 71-4:

$$\sin\_x\_I = A_1 \sin\left[\frac{2\pi x}{L_x}\right]\cos\emptyset \quad (5)$$

$$\sin\_x\_Q = A_1 \sin\left[\frac{2\pi x}{L_x}\right]\sin\emptyset \quad (6)$$

$$\cos\_x\_I = A_1 \cos\left[\frac{2\pi x}{L_x}\right]\cos\emptyset \quad (7)$$

$$\cos\_x\_Q = A_1 \cos\left[\frac{2\pi x}{L_x}\right]\sin\emptyset \quad (8)$$

where $A_1$ is a constant which varies with, among other things, the constant A, the resonator $\tau$ and the integration period. Similar signals are obtained from integrators 71-5 to 71-8, except these vary with the y-position rather than with the x-position. FIG. 3b also illustrates the output voltage 30-9 from one of the in-phase integrators and the output voltage 30-10 from one of the quadrature phase integrators.

As shown in FIG. 3a, the outputs from the integrators 71 are input to an analogue-to-digital converter 73 which converts the outputs into digital values which are input to the A to D interface unit 75 in the digital processing and signal generation unit 59. The digital processing and signal generation unit 59 then performs an arc tangent function (atan 2) on the ratio of the sin_x_I signal and the cos_x_I signal to determine the x-position of the resonant stylus 5 and similarly performs an arc tangent function on the ratio of the sin y_I signal and the cos_y_I to determine the y-position of the resonant stylus 5. The digital processing and signal generation unit 59 also calculates an arc tangent function on the ratio of the quadrature phase component to the in phase component of the signals from the same sensor windings, in order to determine the electrical phase angle ø.

As shown in FIG. 3a, the in phase and quadrature phase component for the signal induced in each of the sensor windings is calculated. This is because, at certain x and y positions, the ratio of the in phase and quadrature phase components from some of the sensor windings will not be reliable. This occurs when the sin or cos position components are approximately zero. Therefore, in this embodiment, the digital processing and signal generation unit 59 determines the electrical phase angle ø using a weighted combination of the in phase and quadrature phase signals from both the sin and cos windings, where the weighting used varies in dependence upon the determined x and y position of the stylus 5. The processing electronics then uses this electrical phase angle measurement to determine if the tip of the stylus 5 has been brought down into contact with the writing surface of the PDA 1. The way in which this is achieved will be described in more detail later.

Returning to FIG. 3a, after the digital processing and signal generation unit 59 has determined the current x-y position of the resonant stylus 5 and determined whether or not the stylus 5 has been brought into contact with the LCD 3, it outputs this information to the PDA electronics through the interface unit 77. This information is then used by the PDA electronics to control information displayed on the LCD 3 and the PDA's mode of operation. In this embodiment, the digital processing and signal generation unit 59 is operable to perform the above calculations approximately 100 times per second when the stylus is in the vicinity of the PDA. However, when the system detects that the stylus is not present, it initially enters a standby state in which the above excitation and processing is performed approximately 20 times per second. After a predetermined length of time in this standby state, the system enters a sleep state in which the above calculations are performed approximately 2 times per second. Once the presence of the stylus is detected again, the processing resumes at the 100 times per second rate.

A brief description has been given above of the way in which the digitiser system of the present embodiment determines the x-y position of the resonant stylus 5 relative to the sensor windings. The particular form of excitation and sensor windings used and the particular resonant stylus 5, digital processing and excitation circuits used in this embodiment will now be described in more detail.

Digitiser Windings

The excitation winding 29 used in this embodiment is formed by two turns of rectangular conductor on each side of the sensor PCB 13 which are connected in series at through holes or vias. In this embodiment, the excitation winding 29 is wound around the outside of the sensor windings (not shown) at the edge of the sensor PCB 13.

Figure 5A:
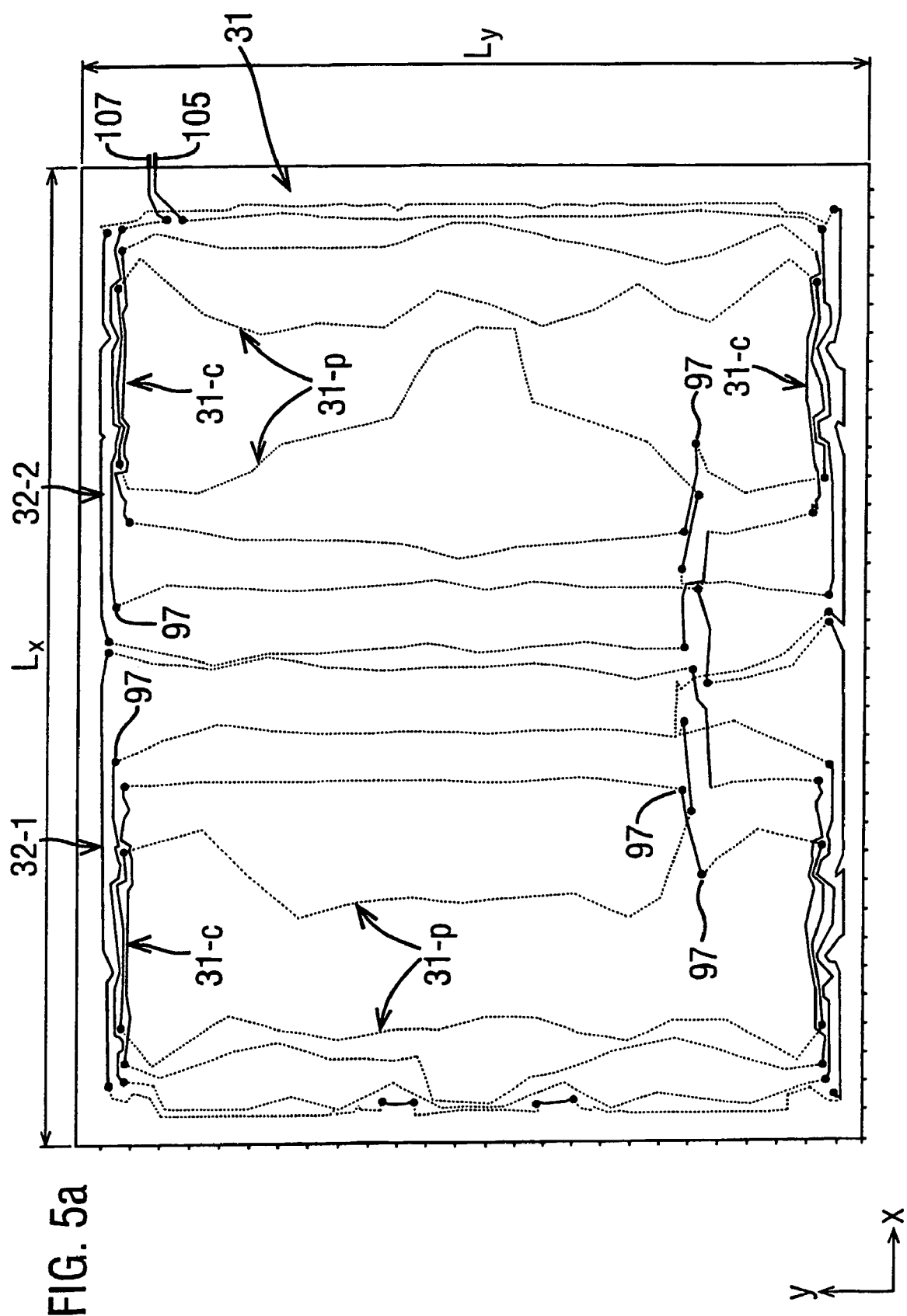
FIG. 5a illustrates the form of a sin x sensor winding of the digitising system which forms part of the personal digital assistant shown in FIG. 1.

FIG. 5a shows the printed conductors which form the sin x sensor winding 31. The printed conductors on the top layer of the sensor PCB 13 are shown as solid lines whilst those on the bottom layer are shown as dashed lines. As shown, the conductor tracks which extend substantially in the x-direction are provided on the top layer of the sensor PCB 13 and those which extend substantially in the y-direction are provided on the bottom layer of the sensor PCB 13 and the ends of the conductor tracks on the top layer are connected to the ends of the conductor tracks on the bottom layer at the via holes, some of which are labelled 97. FIG. 5a also shows the two connection pads 105 and 107 which are provided for connecting the sin x sensor winding 31 to the digitiser electronics.

The conductor tracks of the sin x sensor winding 31 are connected to form two sets of loops 32-1 and 32-2 which are arranged in succession along the x-direction, with each loop extending along the x-direction and being connected in series so that an electromotive force (EMF) induced in loops of the same set by a common background alternating magnetic field add together and so that EMFs induced in the first set of loops 32-1 by a common background alternating magnetic field oppose the EMFs induced in the second set of loops 32-2. As shown in FIG. 5a, in this embodiment, there are four loops in each set of loops 32-1 and 32-2 and each set of loops is arranged to enclose a similar area. Therefore, any EMFs induced in the loops of the first set 32-1 by such a background magnetic field will substantially cancel out with the EMFs induced in the loops of the second set 32-2. However, as those skilled in the art will appreciate, if a point magnetic field source (or something similar such as the resonant stylus) is moved across the sensor winding 31 along the x-direction, then the magnetic coupling between the point source and the sensor winding 31 will vary with the x-position of the point source. As a result of the "figure-of-eight" connection between the two sets of loops 32-1 and 32-2, this variation with x-position can be approximated to be sinusoidal. As those skilled in the art will appreciate, it is because of this approximate sinusoidal variation that the signal induced in the sensor winding 31 by the resonant stylus 5 has a peak amplitude which approximately varies as the sine of the x-position of the stylus 5 relative to the sensor winding 31.

Figure 5B:
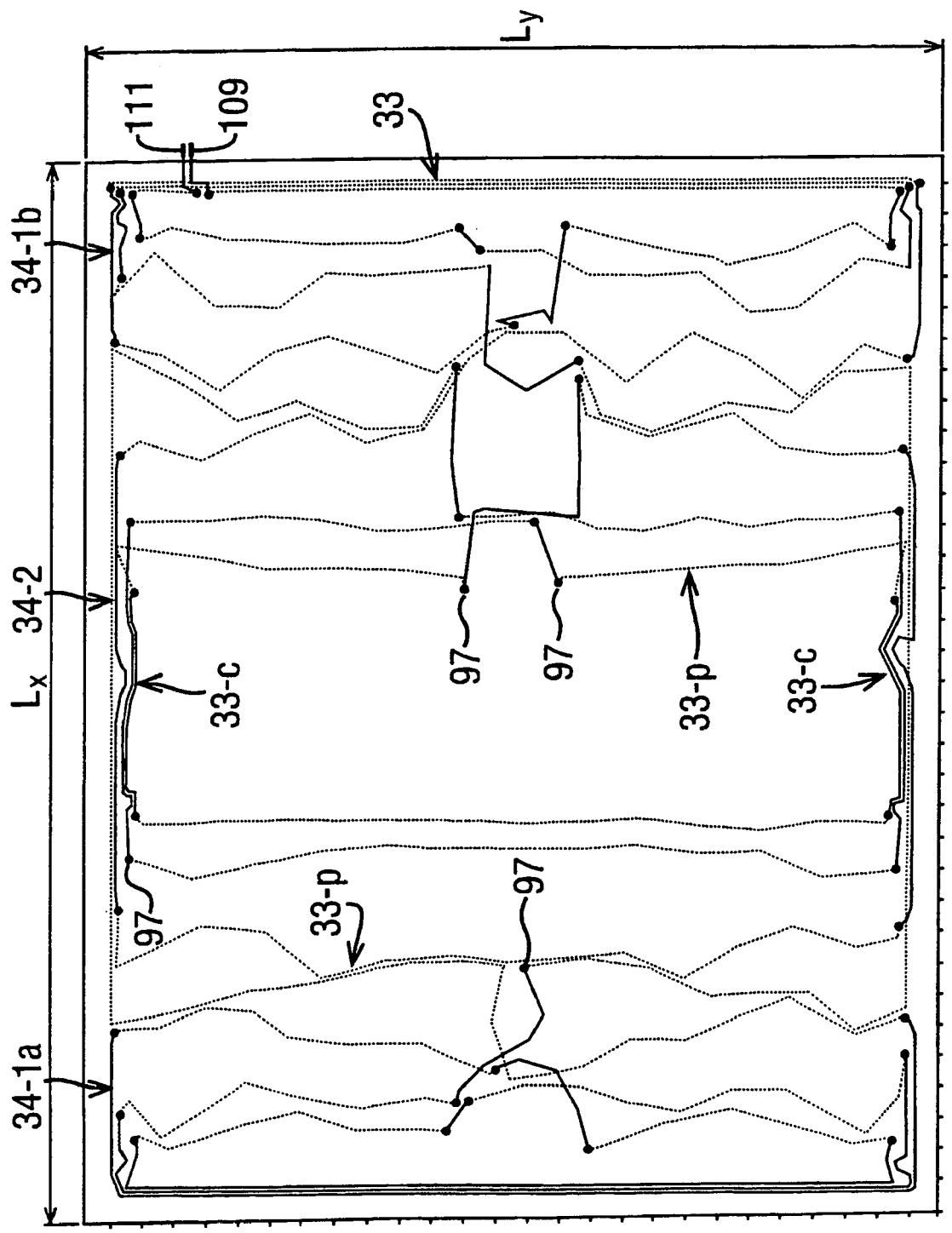
FIG. 5b illustrates the form of a cos x sensor winding of the digitising system which forms part of the personal digital assistant shown in FIG. 1.

FIG. 5b shows the printed conductors which form the cos x sensor winding 33. Again, the printed conductors on the top layer of the sensor PCB 13 are shown as solid lines whilst those in the bottom layer as shown as dashed lines. As with the sin x sensor winding 31, most of the conductor tracks which extend in the x-direction are provided on the top layer of the sensor PCB 13 and most of those which extend in the y-direction are provided on the bottom layer of the sensor PCB 13 and the ends of the conductor tracks on the top layer are connected to the ends of the conductor tracks on the bottom layer at the via holes, some of which are labelled 97. FIG. 5b also shows the two connection pads 109 and 111 which are provided for connecting the cos x sensor winding 33 to the digitiser electronics.

The conductor tracks of the cos x sensor winding 33 are connected to form three sets of loops 34-1a, 34-2 and 34-1b which are arranged in succession along the x-direction, with each loop extending along the x-direction and connected in series so that an EMF induced in loops of the same set by a common background alternating magnetic field add together and so that EMFs induced in the first and third set of loops 34-1a and 34-1b by a common background alternating magnetic field oppose the EMFs induced in the second set of loops 34-2. As with the sin x winding, there are four loops in each set of loops and the loops in the second set of loops are arranged to enclose a similar area to the combined area enclosed by the loops in the first and third set of loops. As a result, EMFs induced in the loops by a background magnetic field will substantially cancel out with each other. However, as with the sin x sensor winding, when the resonant stylus 5 is moved across the sensor winding 33 along the x-direction, the magnetic coupling between the resonant stylus 5 and the cos x sensor winding 33 varies with the x-position of the stylus 5. As a result of the alternating sense of conductor loops, this variation with x-position can be approximated to be sinusoidal. However, since the sets of loops of the cos x sensor winding 33 are shifted in the x-direction by a quarter of the winding pitch ($L_x$), the sinusoidal variation will be in phase quadrature to the variation of the sin x sensor winding 31. As a result, the signal induced in the sensor winding 33 by the resonant stylus 5 has a peak amplitude which approximately varies as the cosine of the x-position of the stylus 5 relative to the sensor windings.

Figure 5C:
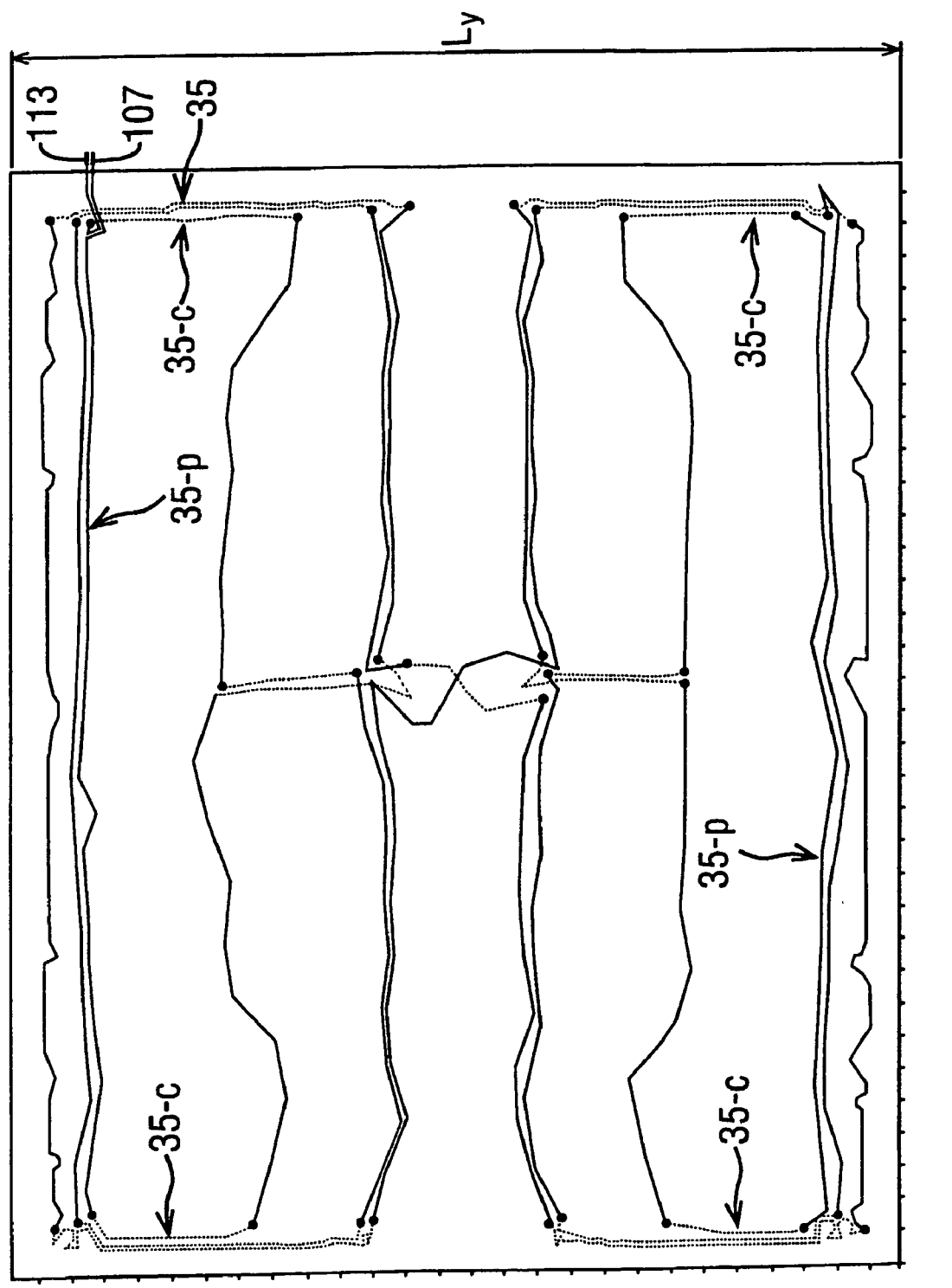
FIG. 5c illustrates the form of a sin y sensor winding of the digitising system which forms part of the personal digital assistant shown in FIG. 1.
Figure 5D:
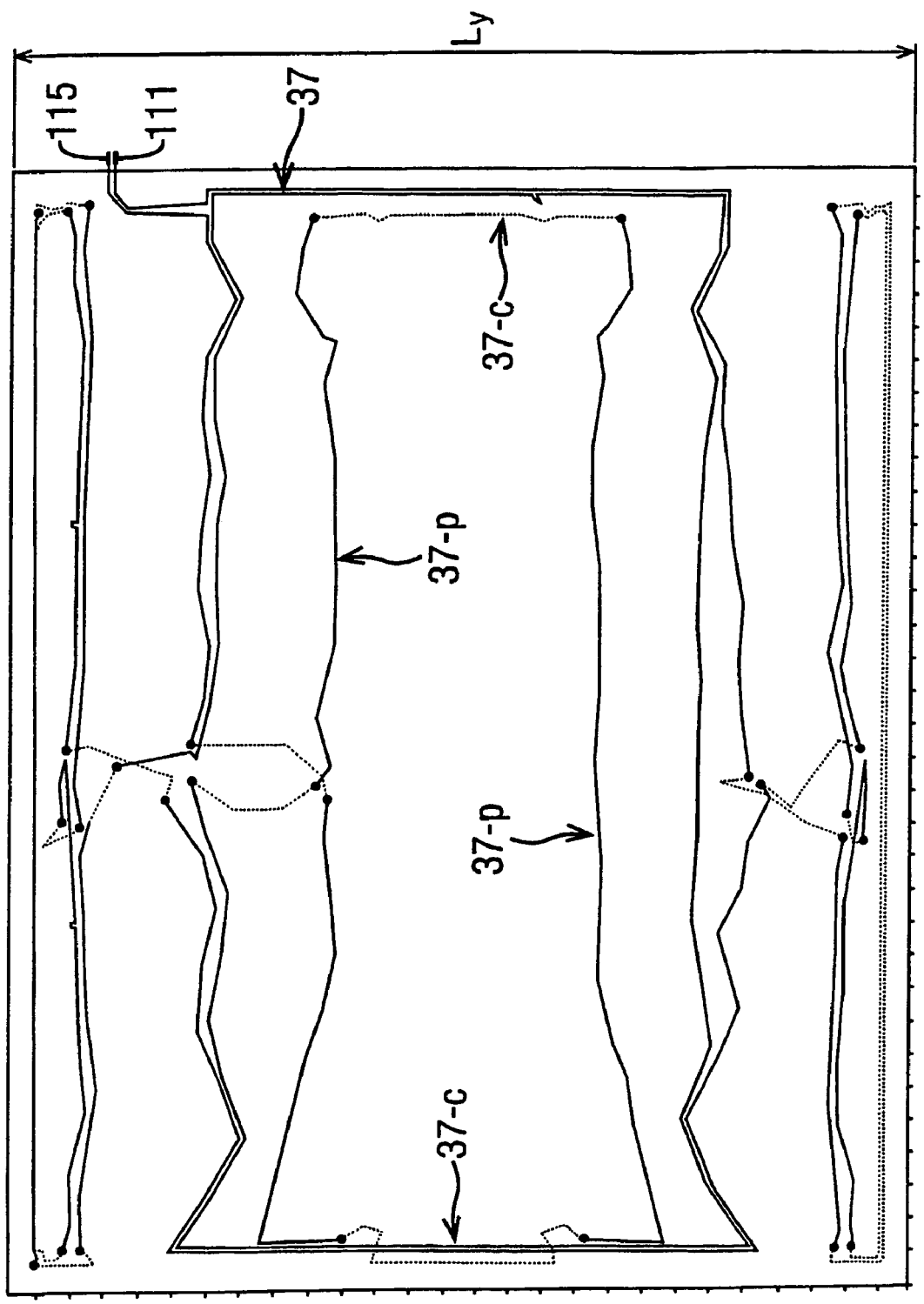
FIG. 5d illustrates the form of a cos y sensor winding of the digitising system which forms part of the personal digital assistant shown in FIG. 1.
Figure 5E:
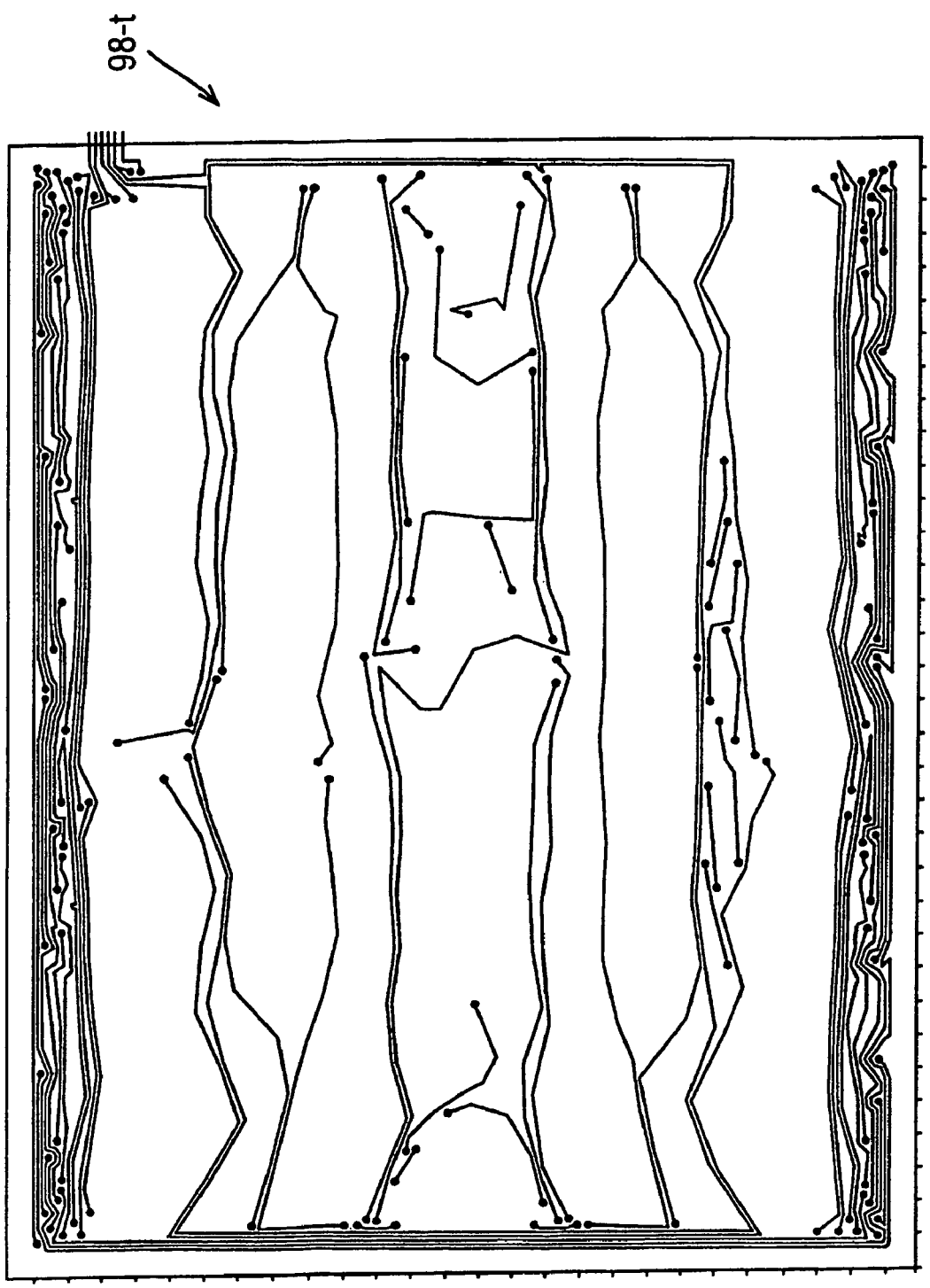
FIG. 5e shows a top layer of a printed circuit board which carries the windings shown in FIGS. 5a to 5e.
Figure 5F:
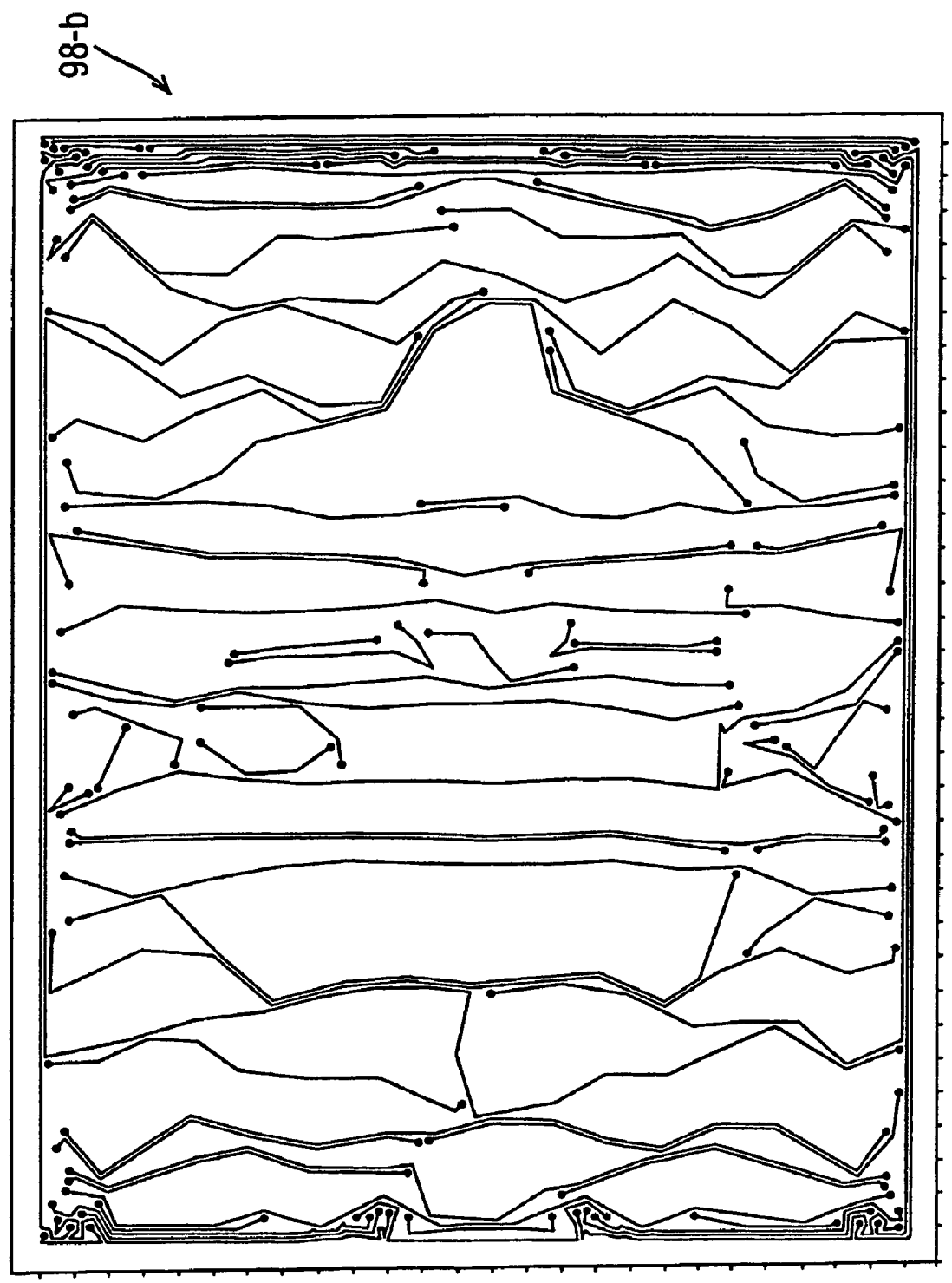
FIG. 5f shows a bottom layer of the printed circuit board which carries the windings shown in FIGS. 5a to 5e.

FIGS. 5c and 5d show the printed conductors which form the sin y sensor winding 35 and the cos y sensor winding 37. As shown in these Figures, these sensor windings are similar to the sin x and cos x sensor windings except they are rotated through 90°. As shown in FIGS. 5c and 5d, the sin y sensor winding 35 shares the connection pad 107 with the sin x sensor winding 31 and the cos y sensor winding 37 shares the connection pad 111 with the cos x sensor winding 33. The other ends of the sin y and cos y sensor windings are connected to connection pads 113 and 115 respectively. FIG. 5e shows the top layer 98-t of printed conductors and FIG. 5f shows the bottom layer 98-b of printed conductors of the sensor PCB 13, which together form the sensor windings 31, 33, 35 and 37. In the circuit board shown in FIG. 5, the conductor tracks have a width of approximately 0.15 mm and the minimum gap between adjacent tracks is approximately the same. Although it is possible to employ finer tracks and gap distances on the PCB, this increases cost due to additional manufacturing precision and lower manufacturing yields.

Design of Sensor Windings

As those skilled in the art will appreciate, the design of the sensor windings is one of the most critical aspects of the digitiser. The design involves, for a given area of printed circuit board, maximising the digitising area and the accuracy of and the signal levels from the sensor windings. As will be apparent to those skilled in the art, an important aspect of the x-direction sensor windings 31 and 33 are the x-positions of the conductor tracks of the windings 31 and 33 which extend in the y-direction. Similarly, an important aspect of the design of the y-position sensor windings 35 and 37 is the y-position of the conductor tracks of the windings 35 and 37 which extend in the x-direction. In the following discussion, these conductors will be referred to as the primary sensing conductors and the tracks which connect the ends of these primary sensing conductors to other primary sensing conductors will be referred to as the connecting conductors. For illustration, some of the primary sensing conductors are indicated by reference numerals 31-p, 33-p, 35-p and 37-p and some of the connecting conductors are indicated by reference numerals 31-c, 33-c, 35-c and 37-c in FIGS. 5a to 5d.

As can be seen from FIGS. 5a to 5d, the most striking feature of most of the primary sensing conductors is their irregular form with multiple bends or kinks as they extend from one side of the sensor board 13 to the other. In all prior art systems that the applicant is aware of, these primary sensor windings are formed by substantially straight parallel lines. However, the applicant has found that the use of such irregular shaped primary sensing conductors can surprisingly result in more accurate position sensing by the digitiser electronics.

These irregular primary sensing conductors can provide accurate position sensing because positional errors caused by irregularities or bends of the primary sensing conductors of the sine winding can be compensated by complementary irregularities or bends in the primary sensor conductors of the cosine winding. These errors then cancel with each other when the arc tangent function is calculated by the digitiser electronics, thereby giving a more accurate position measurement.

There are various ways in which the design of the sensor windings shown in FIGS. 5a to 5d can be made. For example, the position and direction of each of the primary sensing conductors may be manually changed using an iterative trial and error technique until an appropriate design is found which provides the required position sensing accuracy. However, as those skilled in the art will appreciate, such a manual trial and error technique would be highly time-consuming and computer-assisted optimisation techniques can be used to assist in the design of the windings. In order to work, such a computer-assisted system would have to include a mathematical model of the physical interaction between at least the resonator and the sensor windings and the processing performed by the electronics. In such an embodiment, the model would also preferably include details of the interaction between the excitation winding and the sensor windings so that the design of the sensor windings can be chosen to minimise the direct coupling with the excitation winding. An initial starting point design would be provided (such as the design of the windings described in the applicant's earlier international application WO 00/33244) with the objective of the optimisation being to vary the position of at least the primary sensing conductors in order to maximise the position sensing accuracy of the sensor over the entire measurement area. Various constraints may be provided in order to constrain the "solutions" provided by the computer system. For example, a limit may be placed on the number of vias that can be used or different tolerances of position sensing accuracy may be defined for different regions of the sensor board (such as requiring more accurate position sensing in the centre of the board than at the edges or corners of the sensor board).

Stylus

The stylus 5 of the present embodiment overcomes a number of problems with previous styluses which have been proposed and in particular the stylus proposed in WO 00/33244 described above. The stylus 5 is also designed to be sufficiently compact for space-critical applications such as the hand-held PDA 1 of the present embodiment. As mentioned above, the resonant stylus 5 in this embodiment comprises a resonant circuit 41 which includes an inductor coil 45 and a capacitor 43. The resonant stylus 5 is also designed so that the resonant frequency of the resonant circuit 41 changes when the tip of the stylus 5 is brought down into contact with the writing surface of the digitising system.

Figure 6:
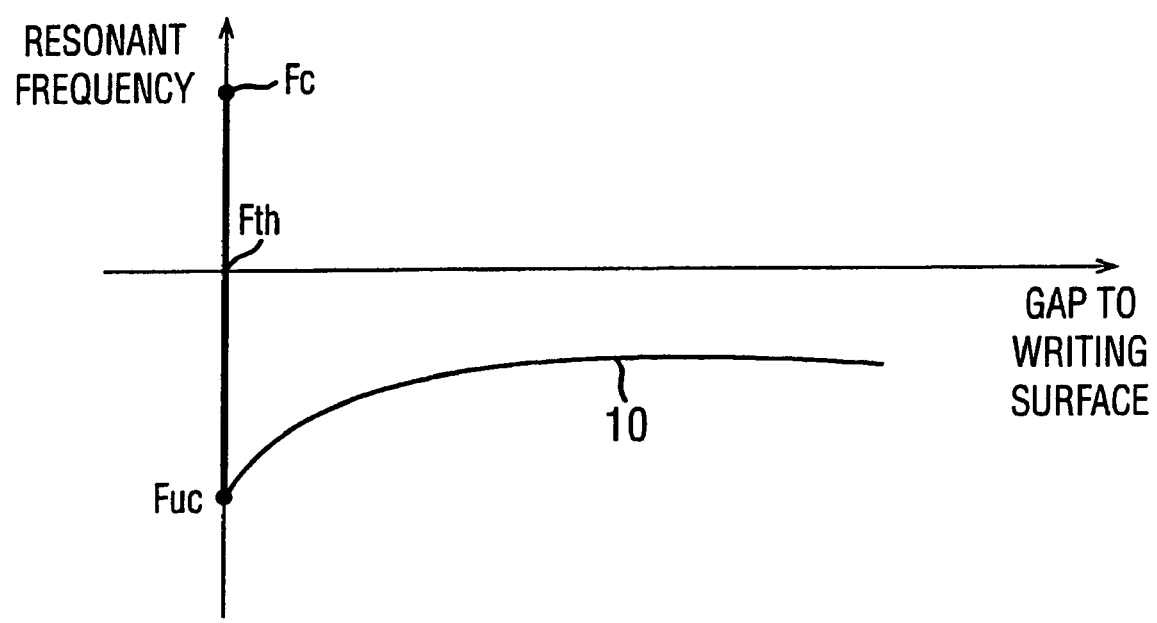
FIG. 6 is a plot illustrating the way in which the resonant frequency of the stylus changes with the gap between the stylus and the writing surface.

FIG. 6 shows a plot 10 illustrating the way in which the resonant frequency of the stylus 5 used in this embodiment changes with the gap between the stylus 5 and the writing surface of the PDA 1. As shown, as the stylus 5 is brought closer to the writing surface, the resonant frequency of the stylus 5 decreases (due to the detuning effect of the magnetic screen 21) to a value of $f_{uc}$ at the point where the nib 159 of the stylus 5 touches the writing surface of the PDA 1. As pressure is applied to the nib, the nib is pushed back into the stylus body into its clicked state, at which point the resonant frequency of the stylus has increased to $f_c$. Therefore, by comparing the measured resonant frequency of the stylus 5 with a threshold frequency ($f_{th}$), the processing electronics can determine whether or not the stylus 5 is in its clicked state or unclicked state. As can be seen from FIG. 6, the change in resonant frequency between the unclicked and clicked states must be greater than the change in frequency caused by the detuning effect of the magnetic screen 21. Therefore, in this embodiment, the stylus 5 is designed to provide a change in resonant frequency of approximately 10% between the unclicked and clicked states. The stylus 5 is also designed so that this change in frequency can be achieved while keeping to a minimum the distance over which the nib of the stylus 5 must travel between the clicked and unclicked states.

The particular structure of the resonant stylus 5 used in this embodiment which achieves these functions will now be described with reference to FIGS. 7 to 9.

Figure 7A:
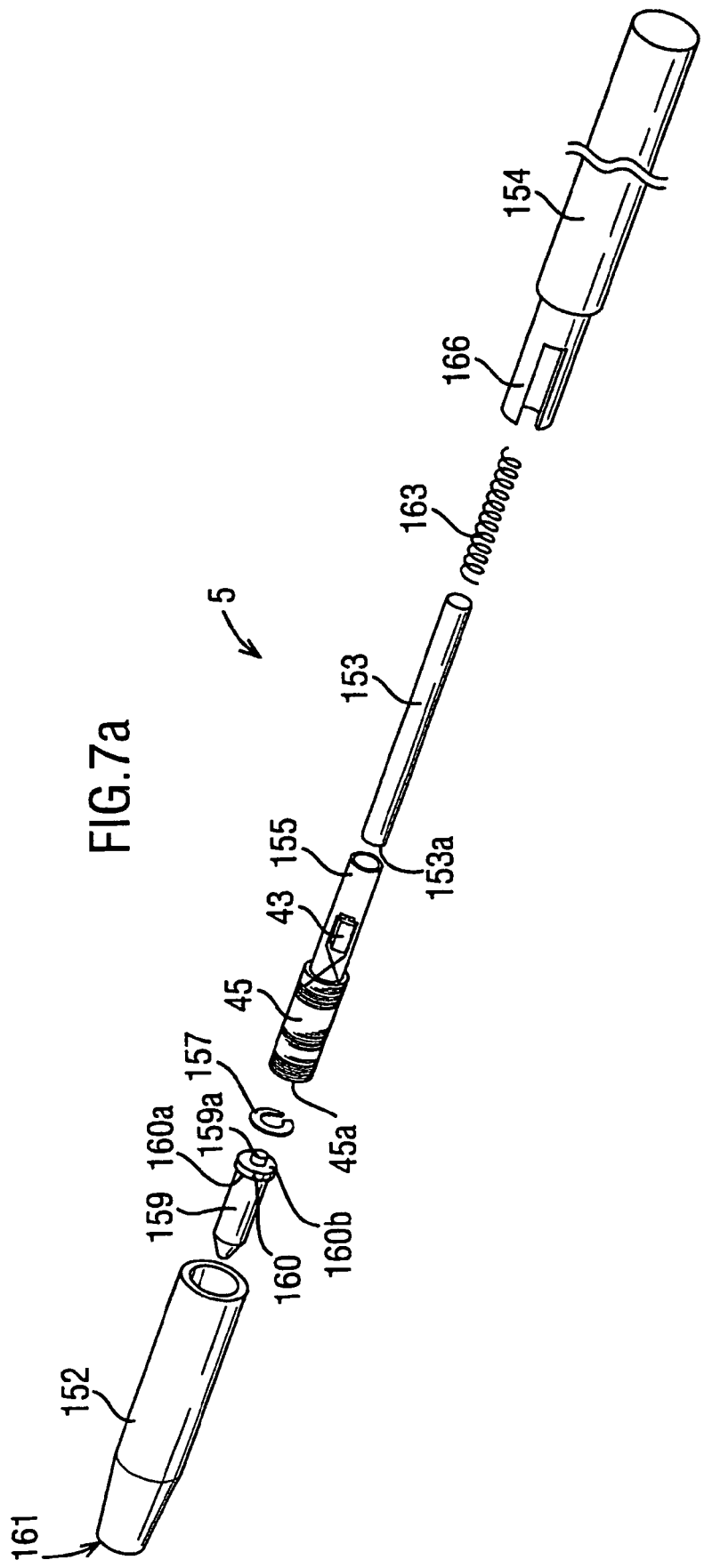
FIG. 7a is an exploded perspective view of the resonant stylus shown in FIG. 1.

FIG. 7a shows an exploded view of the components of the resonant stylus 5 used in this embodiment. As shown, the stylus 5 comprises a hollow front body portion 152 and a hollow rear body portion 154 which house: the resonant circuit 41 comprising the inductor coil 45 and the capacitor 43; a 2 mm diameter ferrite rod 153 (flux linkage element); a plastic sleeve 155 having an inner diameter of 2.1 mm and an outer diameter of 2.2 mm; a split washer 157 (second flux linkage element); a nib 159; and a spring 163. The coil 45 is manufactured from self-bonding enamelled copper wire for low-cost by eliminating a coil former. The ends of the coil 45 are welded to the side of a surface mount capacitor 43 to form the resonant circuit 41. The plastic sleeve 155 having a thin wall section (of approximately 50 microns) made from spirally wound and bonded plastic sheet fits inside the coil 45 and acts as a bearing surface for the ferrite rod 153 and prevents the ferrite rod 153 from rubbing against the capacitor 43 during use. The plastic sleeve 155 has a much thinner cross-section than can be achieved with an injection-moulded component, thereby enabling higher resonator Q-factor and hence lower system power consumption.

In this embodiment, the pen is manufactured as follows. The plastic sleeve 155 is pressed into the coil 45 and glued in place. This assembly is then placed into a jig (not shown) where the capacitor 43 is offered up and held in position. The wire ends of the coil 45 are positioned either side of the capacitor 43 and are welded in place by a welding head (not shown). The nib 159 component is dropped into the front body portion 152, followed by the split washer 157 and the coil assembly. The ferrite rod 153 is then dropped into the plastic sleeve 155. The spring 163 is then dropped into the rear body portion 154 and the forward body portion 152 and the rear body portion 154 are connected together and glued in position.

During the step of glueing the rear body portion 154 to the front body portion, the front body portion 152 and the rear body portion 154 are forced tightly together so that the neck portion 166 forces the coil 45 against the split washer 157 and a first shoulder 167 of the front body portion 152. In this way, the coil 45 and the split washer 157 are fixed in position with respect to the stylus body, with, in this embodiment, the coil 45 being positioned towards a front face 153a of the ferrite rod 153. Further, as shown in FIG. 7a, the neck portion 166 of the rear body portion 154 includes a slot for receiving the capacitor 43 when the front and rear body portions are pushed together. This avoids the need for long coil leads which would be required were the capacitor 43 to be mounted behind the spring 163, and avoids increased assembly complexity and cost.

FIG. 7b shows the assembled stylus 5 in cross-section. The nib 159 and the ferrite rod 153 are slidably mounted within the stylus body and spring-biased (by spring 163) towards the front end 161 of the front body portion 152. The movement of the ferrite rod 153 in this forward direction is, however, limited by the abutment of a front face I 60a (shown in FIG. 7a) of an enlarged head 160 of the nib 159 with a second shoulder 168 (shown in FIG. 7b) of the front body portion 152. Thus, front face 160a and second shoulder 168 comprise a set of abutment surfaces for limiting movement of ferrite rod 153 in the forward direction. When pressure is applied to the nib 159 of the stylus 5 against the biasing force of the spring 163, the nib 159 and the ferrite rod 153 move towards the rear body portion 154 until a rear face 160b of the nib's head 160 abuts against the split washer 157. Thus, rear face 160b and split washer 157 comprise another set of abutment surfaces for limiting movement of ferrite rod 153 in the rearward direction. As shown in FIG. 7b, the ferrite rod 153 can, therefore, only move a predetermined distance ($d_o$), referred to hereinafter as the click-distance, when pressure is applied to the end of the nib 159. In this embodiment, the stylus 5 is designed so that the click distance ($d_o$) is 0.35 mm. This movement of the front face 153a of the ferrite rod 153 from the front face 45a of the coil 45 causes a decrease in the inductance of the coil 45 due to the reduced coupling between the ferrite rod 153 and the coil 45, which in turn gives rise to an increase in the resonant frequency of the resonant circuit 41.

FIGS. 8a and 8b are a partial cross-sectional views of the assembled stylus 5 showing in more detail the relative positions of the ferrite rod 153, the coil 45, the split washer 157 and the nib 159 in these "unclicked" and "clicked" states respectively, and illustrating magnetic field lines 180 passing from the end of the ferrite rod 153 around the coil 45. As shown, in the unclicked state, the ferrite rod 153 is close to the split washer 157, which in this embodiment, is made of Vitrovac 6018, which is a high magnetic permeability material. Therefore, a relatively strong local magnetic field is established with resonating current in the coil 45 as illustrated by the tightly spaced magnetic field lines 180a in FIG. 8a. The radial extent of the locally strong magnetic field 180 is approximately from the inner diameter of the split washer 157 to between the inner and outer radius of the coil 45. The reason for the locally strong magnetic field 180a is that both the ferrite rod 153 and the washer 157 have high magnetic permeability, and the distance between the ferrite rod 153 and the split washer 157 is relatively small compared to the radial extent of the locally strong magnetic field. Consequently, magnetic field couples easily from the ferrite rod 153 into the split washer 157, rather than passing out through the side of the coil 45. In contrast and as shown in FIG. 8b, when the stylus 5 is in its clicked state, the distance between the ferrite rod 153 and the washer 157 is greater and therefore less of the magnetic field 180 couples into the split washer 157 but instead passes out through the side of the coil 45. Therefore, less of the magnetic field couples with all of the coil 45 and the overall inductance of the coil 45 is reduced.

FIG. 9 is a plot illustrating how the resonant frequency of the resonator 41 changes with the gap between the ferrite rod 153 and the end face 45a of the coil 45 with the split washer (plot 8-1) and without the split washer 157 (plot 8-2). As shown in plot 8-1, the stylus 5 with the split washer 157 provides approximately an 8% change in the resonant frequency of the resonator 41 between the unclicked and clicked states. In contrast, without the washer 157, a change in resonant frequency of about 3.5% is achieved. Therefore, the use of the split washer 157 allows a greater change in resonant frequency between the clicked and unclicked states for a given click distance. As discussed in the introduction of this application, this is important where a large frequency change between the clicked and unclicked states is desired together with a relatively small click distance (so that the stylus feels like a conventional pen).

As those skilled in the art will appreciate, a critical component of the manufacturing variability of the stylus 5 is the position of the ferrite rod 153 relative to the end face 45a of the coil 45 and the split washer 157. In the design of the stylus 5 described above, in the unclicked state, the position is set by only two plastic dimensions—the first is the distance between rear face 159a of the nib 159 and front face 160a of the nib's head 160; and the second is the distance between the first shoulder 167 and the second shoulder 168 of the front body portion 152. Since these distances are relatively small (a few millimeters) and close together, it is relatively straightforward to maintain tight control of these distances and therefore tight control of the unclicked frequency of the stylus 5. Similarly, in the clicked state, the position of the ferrite rod 153 relative to the end face 45a of the coil 45 and the split washer 157 is defined by the distance between rear face 159a of the nib 159 and rear face 160b of the nib's head 160. As a result of the small number of critical dimensions (three in this embodiment), the manufacturing cost of the stylus 5 is relatively low. Further, although the plastic parts controlling the relative position of the ferrite rod 153, the coil 45 and the split washer 157 are subject to thermal expansion, because these critical dimensions are relatively small and close together, the position changes little with temperature.

The thickness of the split washer 157 also has an effect on the relative position of the ferrite rod 153, the coil 45 and the washer 157, but that thickness is well controlled because the washer material may either be manufactured from a punched sheet of metal formed in a rolling process or by a suitable etching process. For example, a sheet of the material may be covered with a photoresist, preferably on both sides, and then the resist exposed to ultraviolet light through a mask patterned with the required shape. The sheet is then etched in chemical solution leaving the washers, usually held by a spike of metal to the original sheet. The washers are then cut from the sheet and assembled into styluses. An advantage of etching is that there is no mechanical stressing so that there is no loss in magnetic permeability that would otherwise reduce frequency shift and introduce variability.

Stylus Testing

Figure 10:
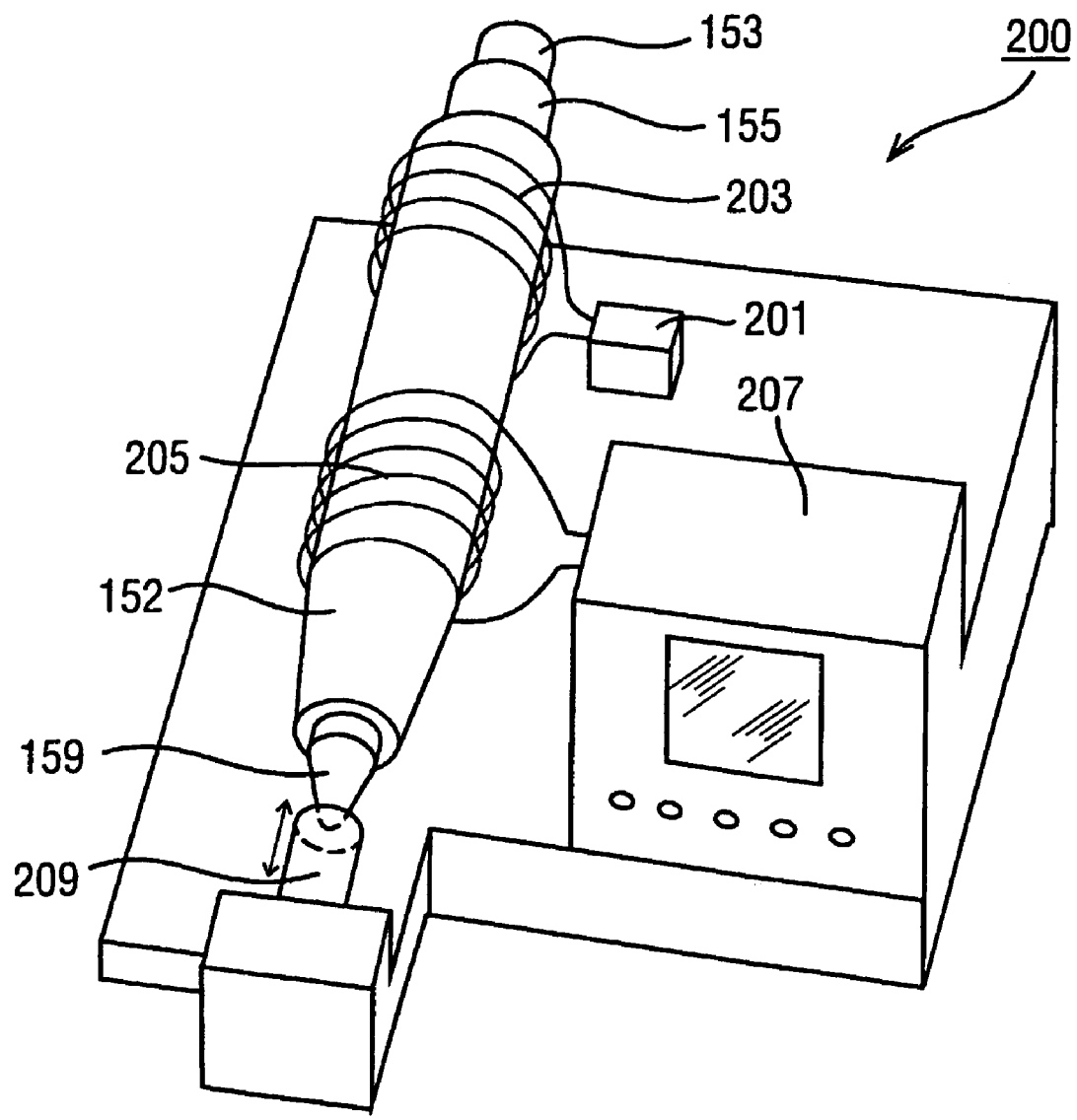
FIG. 10 is a diagrammatical view of test equipment used to test the resonant frequency of the stylus during manufacture to ensure that the clicked and unclicked resonant frequencies fall within required tolerances.

In this embodiment, the resonant frequency of each stylus 5 is tested before the front body portion 152 is glued together with the rear body portion 154. This testing is performed by the testing apparatus 200 schematically illustrated in FIG. 10. As shown, the testing apparatus 200 includes a pulsed current source 201 which applies a pulse of excitation current to a coil 203 which is magnetically coupled to the coil 45 in the stylus 5 which causes the resonant circuit 41 to resonate. The current from the pulsed current source 201 is then stopped and the resonator 41 continues to resonate and this resonating signal induces an EMF in a second coil 205 wound around the stylus 5. This induced EMF is then passed to a signal detector, processor and display unit 207 which measures the frequency of the ring-down signal, for example by performing a Fourier analysis of the sampled waveform. The signal detector, processor and display unit 207 also controls a nib actuator 209 which applies pressure to the nib 159 forcing the stylus 5 into its clicked state. The same excitation and measurement process is then carried out to determine the resonant frequency of the stylus 5 in the clicked state. The signal detector, processor and display unit 207 then compares the unclicked resonant frequency and the clicked resonant frequency with predefined manufacturing limits and the stylus assembly is rejected if the measured values fall outside those limits. If the measured frequencies are within the manufacturing limits, then the rear body portion 154 is glued to the front body portion 152. As those skilled in the art will appreciate, the advantage of testing the partially assembled stylus 5 is that if the measured clicked and unclicked resonant frequencies fall outside the manufacturing limits, then the failure is identified earlier in the manufacturing process and hence there is less wastage.

Manufacturing Limits

Figure 11:
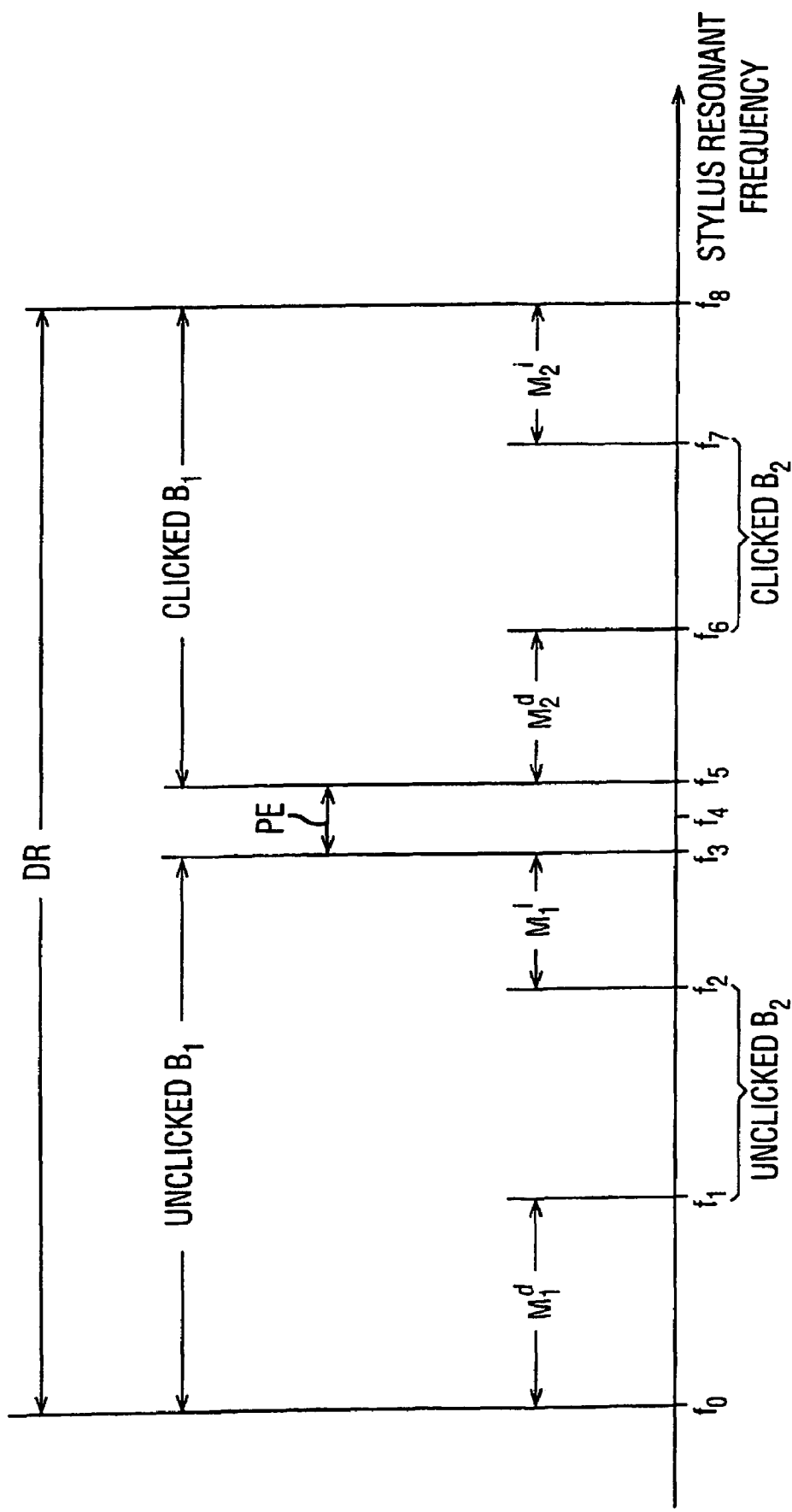
FIG. 11 is a frequency plot illustrating a required unambiguous frequency detection range required of the positioning system and illustrating the range over which the resonant frequency of the stylus may vary between the clicked state and the unclicked state.

As discussed above, during the testing of each stylus 5 during manufacture, the clicked and unclicked resonant frequencies of the stylus 5 are compared with manufacturing limits. In particular, in this embodiment, each stylus 5 is designed so that their clicked and unclicked resonant frequencies lie within a "free space clicked resonant frequency band" and a "free space unclicked resonant frequency band", respectively. These are shown in FIG. 11 as the unclicked band $B_2$ between frequency $f_1$ and $f_2$ and the clicked band $B_2$ between frequency $f_6$ and $f_7$. The system is designed, however, to be able to detect pen frequencies over a much larger frequency range (DR) extending from frequency $f_0$ to $f_8$. This allows for a margin of frequency increase and decrease of the free space clicked and unclicked resonant frequencies due to, for example, changes in temperature and due to the proximity of the stylus 5 to conductive or magnetically permeable objects. These margins are illustrated by the bands $M_1^d$ extending from frequency $f_0$ to $f_1$; margin $M_1^i$ extending from frequency $f_2$ to $f_3$; margin $M_2^d$ extending from frequency $f_5$ to $f_6$; and margin $M_2^i$ extending from frequency $f_7$ to $f_8$. An overall unclicked frequency band $B_1$ extending from frequency $f_0$ to frequency $f_3$ and a clicked frequency band $B_1$ extending from frequency $f_5$ to frequency $f_8$ are therefore defined. A frequency spacing is also provided (labelled PE and extending from frequency $f_3$ to $f_5$) to account for phase detection inaccuracy in the electronics which results in uncertainty for frequencies close to the threshold frequency ($f_4$) used to determine the click state of the stylus 5.

Digital Processing and Signal Generation Unit

A brief description was given above with reference to FIG. 3 of the digital processing and signal generation unit 59. A more detailed description of the digital processing and signal generation unit 59 used in this embodiment will now be described with reference to FIG. 12. The components shown in FIG. 3 have been labelled with the same reference numeral.

Figure 12:
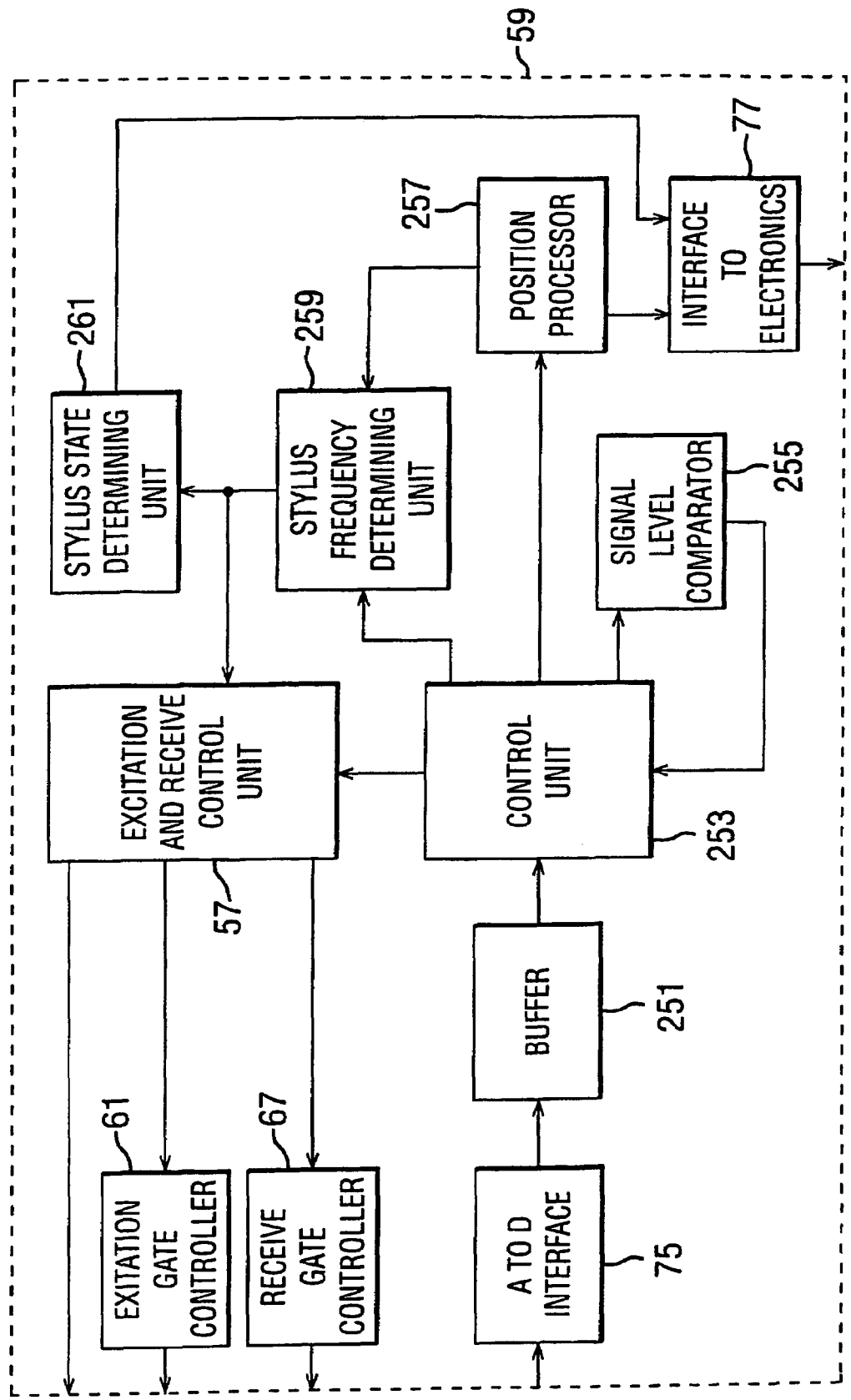

As shown in FIG. 12, the digital values output by the analogue-to-digital converter 73 are passed via the A to D interface 75 to a buffer 251. At the end of a pulse echo excitation/receive cycle, eight digital values will be stored in the buffer 251 representing the in-phase and quadrature phase signal levels generated for each of the four sensor windings. A control unit 253 is provided for reading out these digital values and for passing them to the appropriate processing modules for processing. In this embodiment, the control unit 253 initially passes the digital signal values to a signal level comparator 255 which compares the signal levels with a threshold value. If all of the signal levels are below the threshold level, then this indicates that the stylus 5 is not in the vicinity of the PDA 1 and therefore, no further processing is required. If, however, the signal level comparator 255 determines that the signal levels are above the threshold, then it indicates back to the control unit 253 that the stylus 5 is present and that the signals should be processed by the other processing modules. In response, the control unit 253 passes the in-phase signal components to a position processor 257 which calculates the above-described arc tangent functions using the in-phase components to determine the x-y position of the stylus 5 relative to the sensor board 13.

The control unit 253 also passes the in-phase and quadrature phase components to a stylus frequency determining unit 259 which, as discussed above, performs the above mentioned arc tangent function on the in-phase and quadrature phase components of the signals from the same sensor winding, to generate a measure of the electrical phase (ø) of the received signal. This electrical phase can then be mapped to a difference in frequency between the resonant frequency of the stylus 5 and the fundamental frequency $F_0$ of the excitation signal applied to the excitation winding 29. However, the relationship relating this phase measurement to the frequency difference is cyclic in nature and can therefore only provide a unique one-to-one relationship between the measured phase and the resonant frequency for a limited range of frequency differences. Further, this range of frequency differences depends, among other things, on the number of excitation cycles ($N_{TX}$) in the burst of excitation current applied to the excitation winding 29 and the number of receive cycles ($N_{RX}$) over which the demodulated signals are integrated.

Figure 13:
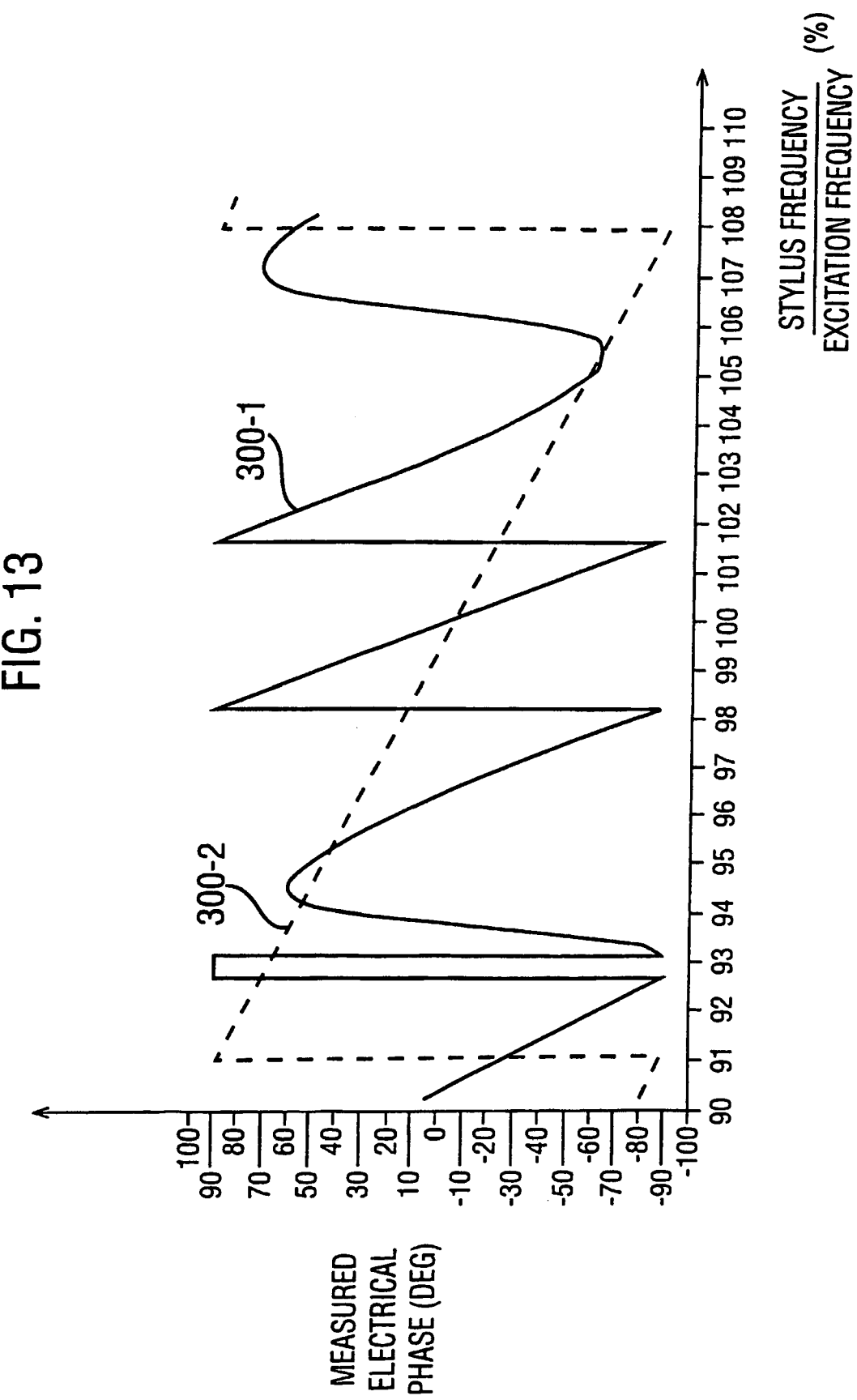
FIG. 13 is a plot illustrating the way in which the electrical phase of the sensor signals varies with the difference in frequency between the resonant frequency of the stylus and the excitation frequency.

In the illustration shown in FIG. 3*b*, sixteen excitation cycles and sixteen receive cycles were used. With this number of excitation cycles and receive cycles, the phase measurement can only provide an unambiguous indication of the resonant frequency of the stylus 5 if the resonant frequency is within 3.5% of the excitation frequency. This is illustrated in plot 300-1 shown in FIG. 13. In particular, FIG. 13 shows the measured electrical phase (ø) plotted on the y-axis against the ratio of the stylus 5 resonant frequency to the excitation frequency as a percentage. As shown, this plot 300-1 is linear only for the ratio between the stylus frequency and the excitation frequency varying (as a percentage) between 98.2 and 101.7. Outside this range, the plot 300-1 repeats in a non-linear and cyclic manner. The system can therefore only unambiguously determine the resonant frequency of the stylus 5 if it is within a range of 1.75% of the excitation frequency on either side of the excitation frequency. This is sufficient for the type of stylus described in the applicant's earlier International application WO 00/33244, but not for the stylus 5 described above which is designed so that the resonant frequency changes by approximately 8% between its clicked and unclicked states.

This problem can be overcome by reducing the number of transmission and reception cycles (i.e. $N_{TX}$ and $N_{RX}$) in the pulse echo measurement, which has the effect of increasing the unambiguous range of frequencies of the plot 300. This is illustrated in FIG. 13 by the plot 300-2. In particular, plot 300-2 illustrates the relationship between the measured electrical phase (ø) and the percentage of the stylus resonant frequency to the excitation frequency when $N_{TX}=N_{RX}=3$. As shown, with this arrangement the resonant frequency of the stylus 5 can be determined unambiguously provided it is between 91% and 108% of the excitation frequency. This corresponds to a range of approximately 17%, which is sufficient for the stylus 5 used in this embodiment.

However, with such a low number of transmission and reception cycles ($N_{TX}$ and $N_{RX}$) being used, the measurement accuracy is significantly reduced. In particular, all resonant stylus detection systems suffer from phase detection inaccuracies. This error has many sources but is typically due to uncontrolled variable time delays in the processing channel, such as the slew rate of the power amplifier 51 shown in FIG. 3*a*. In order to determine correctly the click state of the stylus 5, it is necessary that this processor phase error corresponds to a sufficiently small processor frequency error band (frequency band PE illustrated in FIG. 11). Unfortunately, when the number of transmission and reception cycles are reduced so that the system can detect the stylus 5 used in this embodiment over the entire frequency range (DR), the processor frequency error is greater than before and is typically greater than the processor frequency error band (PE) required.

A further problem with using a small number of transmission cycles and reception cycles is that more energy is spread over the entire frequency band of operation, which reduces the power efficiency of the device as a whole. The issue of low power efficiency is described in detail in the applicant's earlier International application WO 01/29759. As described in this earlier International application, such low power efficiency systems are undesirable in hand-held battery-powered devices such as the PDA 1 of the present embodiment.

In this embodiment, therefore, the conflicting requirements of unambiguous phase detection over a wide frequency range and a frequency accuracy high enough to accurately detect the click status of the stylus are resolved by introducing a two-stage measurement cycle.

In the first stage a pulse-echo excitation/reception cycle is performed with $N_{TX}$ and $N_{RX}$ set to 3, with the fundamental frequency $F_0$ of the excitation signal being in the middle of the required frequency range (i.e. approximately at the decision frequency $f_4$ shown in FIG. 11). This first stage measurement will provide an electrical phase measurement that is unambiguous over the required frequency range (DR). The position processor 257 and the stylus frequency determining unit 259 can therefore determine an approximate x-y position of the stylus 5 relative to the sensor board 13 and the approximate resonant frequency of the stylus 5, but subject to the frequency and phase errors discussed above.

As shown in FIG. 12, the stylus frequency determined by the stylus frequency determining unit 259 is output to a stylus state determining unit 261. If the determined stylus frequency is far enough from the decision frequency ($f_4$) then, with all errors accounted for, it is possible to determine the click state of the stylus 5. If the determined frequency is not far enough from the decision frequency ($f_4$), then the stylus state remains uncertain.

In this embodiment, immediately after the first stage measurement cycle has been carried out, a second more accurate measurement cycle is performed using a pulse-echo excitation/reception cycle with $N_{TX}=N_{RX}=16$ and with the fundamental frequency $F_0$ of the excitation signal being chosen to be close to the resonant frequency of the stylus 5 determined in the first measurement stage by the stylus frequency determining unit 259. This closeness between the excitation frequency and the stylus resonant frequency allows for the greater number of transmission cycles and reception cycles to be used, thereby allowing for more accurate position and phase measurements to be obtained and allowing for a more power efficient measurement cycle.

In particular, in this embodiment, the excitation and receive control unit 57 receives the approximate resonant frequency of the stylus 5 determined by the stylus frequency determining unit 259 from the signals of the first stage measurement cycle. It then outputs a control signal to the variable frequency generator 53, setting the fundamental frequency ($F_0$) of the excitation and mixing signals to be generated. The excitation and receive control unit 57 also outputs appropriate gate control signals to the excitation gate controller 61 and the receive gate controller 67 so that, in the second stage measurement cycle, sixteen excitation periods are transmitted and so that the integration of the demodulated signals is performed over sixteen excitation is periods (i.e. $N_{TX}=N_{RX}=16$). The data from this second more accurate measurement cycle is then passed to the position processor 257 and the stylus frequency determining unit 259 as before, where more accurate estimates of the x-y position of the stylus 5 relative to the sensor board 13 and the resonant frequency of the stylus 5 are determined. This more accurate measurement of the resonant frequency of the stylus 5 is then passed to the stylus state determining unit 261 which compares the measured frequency with the decision frequency $f_4$ to determine if the stylus 5 is in its clicked state or its unclicked state. This determination together with the accurate x-y position measurement is then passed to the PDA electronics via the interface 77.

The entire two-stage measurement process described above is then repeated so that the position of the stylus 5 relative to the sensor board 13 can be tracked.

As those skilled in the art will appreciate, the above processing provides a number of advantages. These include:
i) power consumption of the system may be reduced by cancelling the second stage measurement if the first stage measurement does not detect the presence of the stylus 5;

ii) the first measurement stage can be optimised to minimise power consumption since accurate detection of position and resonant frequency of the stylus 5 is performed in the second measurement stage;

iii) in the second measurement stage, the excitation frequency transmitted may be at one of a set fixed number of frequencies spread between $f_0$ and $f_8$ (usually the closest one to the resonant frequency of the stylus 5 determined from the first measurement stage), thereby simplifying the decision making process and making the system more deterministic;

iv) if the first measurement stage results in high signal amplitudes (e.g. because the stylus 5 is in close proximity to the sensor board 13), then the second measurement stage can be performed at a lower power level while still maintaining sufficient frequency and position accuracy and resolution, thereby saving power; and v) if the first measurement cycle results in low signal amplitudes then the processing electronics can increase the power or increase the sensitivity of the detection circuits for the second measurement cycle (this is an advantage over the prior art systems where power level and sensitivity settings are set for worst case conditions, resulting in power consumption that is higher than is actually required on average).

Modifications and Alternative Embodiments

In the above embodiment, a hand-held personal digital assistant has been described which includes an x-y digitising tablet which operates with a resonant stylus. Various novel features of the digitiser windings, the stylus and the processing electronics have been described which make the system suited for such low cost high volume applications. The skilled reader will appreciate that many of the novel aspects of the system described are independent of each other. For example, the stylus described above can operate with the prior art digitiser windings described in U.S. Pat. No. 4,878,553 or WO98/58237 and the digitiser windings described above can operate with the prior art stylus, such as those described in U.S. Pat. No. 5,565,632, or with any other prior art magnetic field generating or altering device.

A number of modifications and alternative embodiments will now be described.

In the above embodiment, a magnetic washer was provided to increase the change in the resonant frequency of the stylus between its clicked and unclicked states. As those skilled in the art will appreciate, it is not essential to use such a magnetic washer. Further, if a magnetic washer is to be used, it is not essential that the washer is split. However, using a split washer prevents eddy currents being generated in the washer which would generate their own magnetic field which would oppose the magnetic field generated by the resonant circuit. Further, if a washer is to be used, it does not need to be formed as a flat ring with circular inner and outer edges. For example, the washer may be star-shaped, with a star-shaped or square etc. central hole. Further, the washer need not necessarily have a smaller inside diameter than the ferrite rod. FIG. 14 illustrates an alternative embodiment where the ferrite rod 153 may pass through the magnetic washer 157 in operation. In particular, FIG. 14a illustrates the alternative stylus design in the unclicked state, with the ferrite rod 153 extending through the inner diameter of the split washer 157. As pressure is applied to the nib 159 of the stylus, the ferrite rod 153 passes through the washer 157 thereby increasing the gap between the ferrite rod 153 and the split washer 157.

In the main embodiment described above, the unclicked position of the ferrite rod relative to the coil and the split washer was defined by the distance between the rear face 159a of the nib 159 and the front face 160a of the nib's head 160; and the distance between the first shoulder 167 and the second shoulder 168 of the front body portion 152. Alternatively, the unclicked position may be defined by the thickness of a non-conductive, non-magnetic spacer. Such an embodiment is illustrated in FIG. 15 which shows the spacer 303 provided between the ferrite rod 153 and the washer 157. The thickness of the spacer 303 can be tightly toleranced compared to dimensions of injection-moulded parts. In this case, plastic tolerances ensure that the rear face 159a of the nib 159 does not touch the spacer 303 in the unclicked state. In the clicked state, shown in FIG. 15b, the ferrite rod 153 position relative to the coil 45 and washer 157 is defined by only one dimension, the distance between the rear face 159a of the nib and the rear face 160b of the nib head 160. That dimension can be tightly controlled since the same side of an injection mould tool can define both faces. In a further alternative, the spacer 303 can be omitted, but low unclicked resonator Q-factor may result due to eddy currents in the split washer since the ferrite rod 153 will rest on the split washer 157.

The split washer may be manufactured from Permalloy for low cost and ease of handling, or from any other magnetically permeable metals such as Mumetal or spin-melt ribbon. A non-conductive magnetically permeable device, for example a ferrite component, may replace the metal washer. In this case, there is no need for a split in the washer and the ferrite and washer may contact each other without Q-factor penalty. The ferrite component may be thicker than the washer since it is easier to manufacture and handle that way. There will be an increase in the frequency shift between the clicked and unclicked frequencies in this case, due to the low resistance to magnetic field passing through the washer component. However, a disadvantage of a ferrite washer component is that the tolerance on its thickness may be significantly greater than that of a thin metal washer.

In the above embodiment, the resonant frequency of each stylus was tested for both the clicked and unclicked states at the time of manufacture, to ensure that the resonant frequencies were within the manufacturing tolerances. If they were not, then the stylus was discarded. Alternatively, if the clicked or unclicked resonant frequency do not meet the required manufacturing limits, then the manufacturing step may include the additional step of varying the stylus set-up in order to change the clicked resonant frequency and/or the unclicked resonant frequency. This may be achieved in a number of different ways.

FIG. 16 schematically illustrates a mechanical approach to varying the clicked and unclicked resonant frequencies of the stylus at the time of manufacture. In this case, the resonant frequency is adjusted with a small adjustment in the relative axial position of the ferrite rod 153 and the nib 159. This adjustment is achieved with a pin 301 sliding in a recess 302 in the nib 159. The pin 301 or recess 302 or both may be splined to prevent the pin insertion creating stored pressure that subsequently shifts the position of the pin 301. Glue is preferably applied to the pin 301 or recess 302 before assembly. When the ferrite rod 153 has been dropped into position or is forced downwards to press the pin 301 into the nib 159 until a frequency measurement system, such as the one illustrated in FIG. 10, indicates the optimum frequency has been reached. This adjustment step may be performed with the nib 159 in any chosen position with an appropriate frequency target, such as the desired clicked or unclicked resonant frequency.

A similar approach is to perform an initial test of the resonant frequency of the stylus with a pin 301 of known length, then to remove this pin 301 and ferrite rod 153 and to reassemble it with an alternative pin 301 whose length is determined by the results of the initial test. An alternative to this approach is illustrated in FIG. 17, where a spacer 303 is added between the nib 159 and the ferrite rod 153, with the thickness of the spacer being determined from the initial test. The initial test may be performed with a stylus with no spacer, or possibly a reference spacer. In both these situations, the algorithm for choosing a spacer or pin component may be performed automatically by the signal detector, processor and display unit of the test apparatus.

As a further alternative to removing the ferrite rod 153 in order to remove a pin 301 to adjust frequency, the height of the rear end face 159a of the nib 159 relative to rear face 160b of the nib head 160 can be reduced by spinning the ferrite rod 153 at high speed and pressing it against the nib 159 until the friction has softened the nib 159 and the ferrite rod 153 has reached the required position.

Another alternative is to assemble the stylus 5 with the coil 45 free to slide, requiring a modification to the design of the rear body portion 154 so that it no longer locates the coil 45 against the front body shoulder 167. Initially, the coil 45 would be against the front body shoulder 167. The resonant frequency of the stylus would then be tested with an appropriate test apparatus. The nib 159 would then be forced upward and released and the unclicked frequency measured. While the unclicked frequency is above the desired resonant frequency, this process would be repeated, each time increasing the distance between the coil 45 and the front body head 160. In this way, the unclicked frequency is set to the target value. The coil 45 may then be glued in position, for example, by injecting glue through a small hole in the side of the stylus body. Or, if glue were previously applied to the coil 45, the cure time of the glue may be chosen such that movement during adjustment as described above is possible but further movement after adjustment is prevented.

Figure 18:
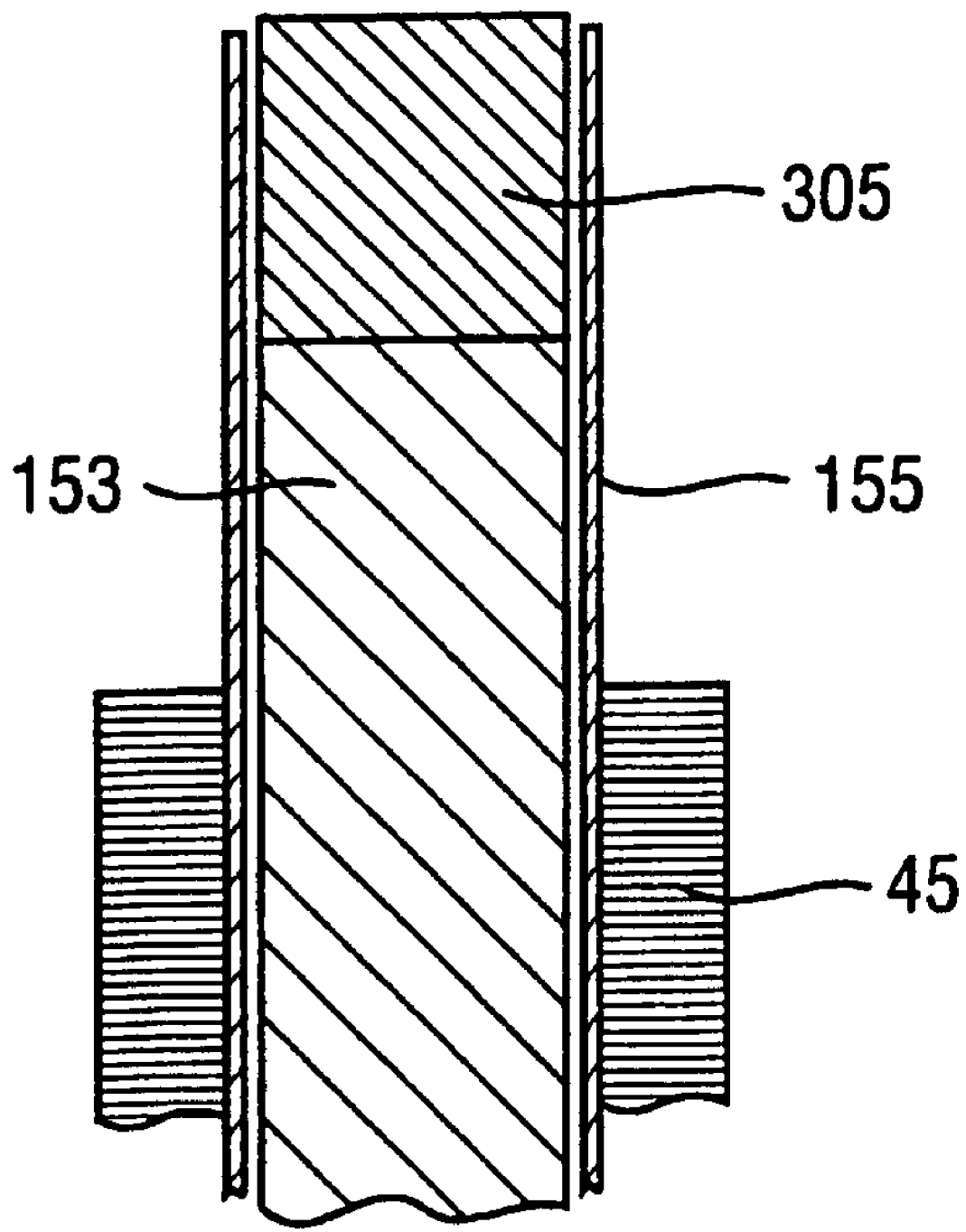
FIG. 18 is a partial cross-sectional view of a stylus illustrating the way in which the resonant frequency of the stylus may be varied at the time of manufacture by adding an additional length of ferrite rod.

As those skilled in the art will appreciate, it is also possible to vary the resonant frequency of the resonator 41 by changing the length of the ferrite rod 153. For example, when the front body sub-assembly is tested using the test apparatus, the top of the ferrite rod 153 may be ground shorter until the resonant frequency reaches the desired target value. Alternatively, as illustrated in FIG. 18, an additional length of ferrite 305 may be added to the assembly, to increase the effective length of the ferrite rod 153. Again, the length of this additional ferrite component 305 would be chosen depending on the results of an initial test of the resonant frequency. As shown in FIG. 18, in this case, the plastic sleeve 155 preferably acts to retain the additional ferrite component 305.

As an alternative to mechanical trimming, the value of the capacitor 43 may be modified, for example by laser trimming. Another option is to vary the number of turns in the coil 45. For example, turns may be added or removed from the coil 45 with the stylus in a test apparatus such as that shown in FIG. 10. The coil ends would be left long so that it is possible to wind further turns over the plastic sleeve 155. The operator would add or subtract turns until the resonant frequency of the stylus reached the required target frequency band.

Figure 19:
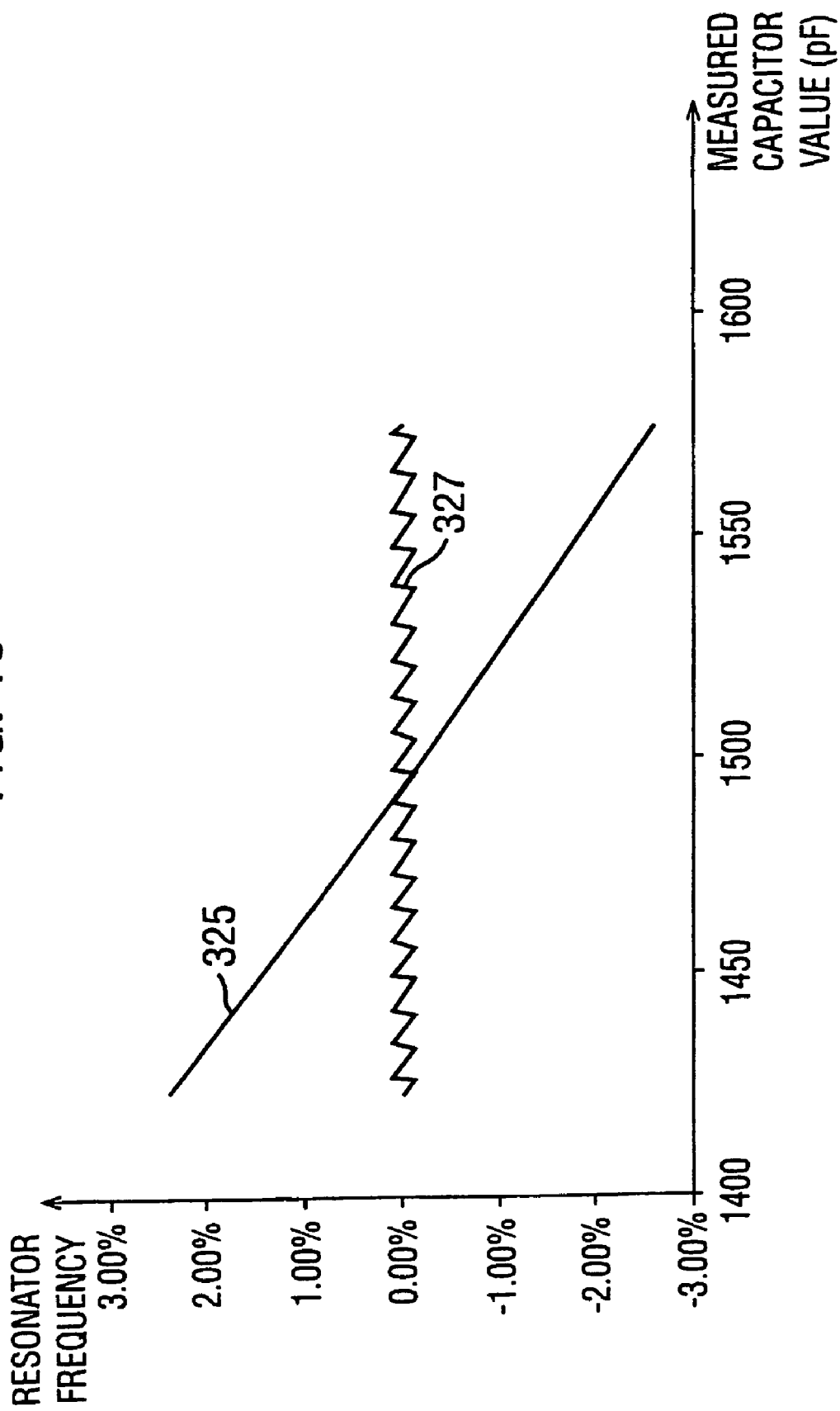
FIG. 19 is a plot illustrating the way in which the resonator frequency changes with capacitor value with a fixed number of coils and with the number of coils being varied to maintain a relatively fixed resonator frequency.
Figure 20:
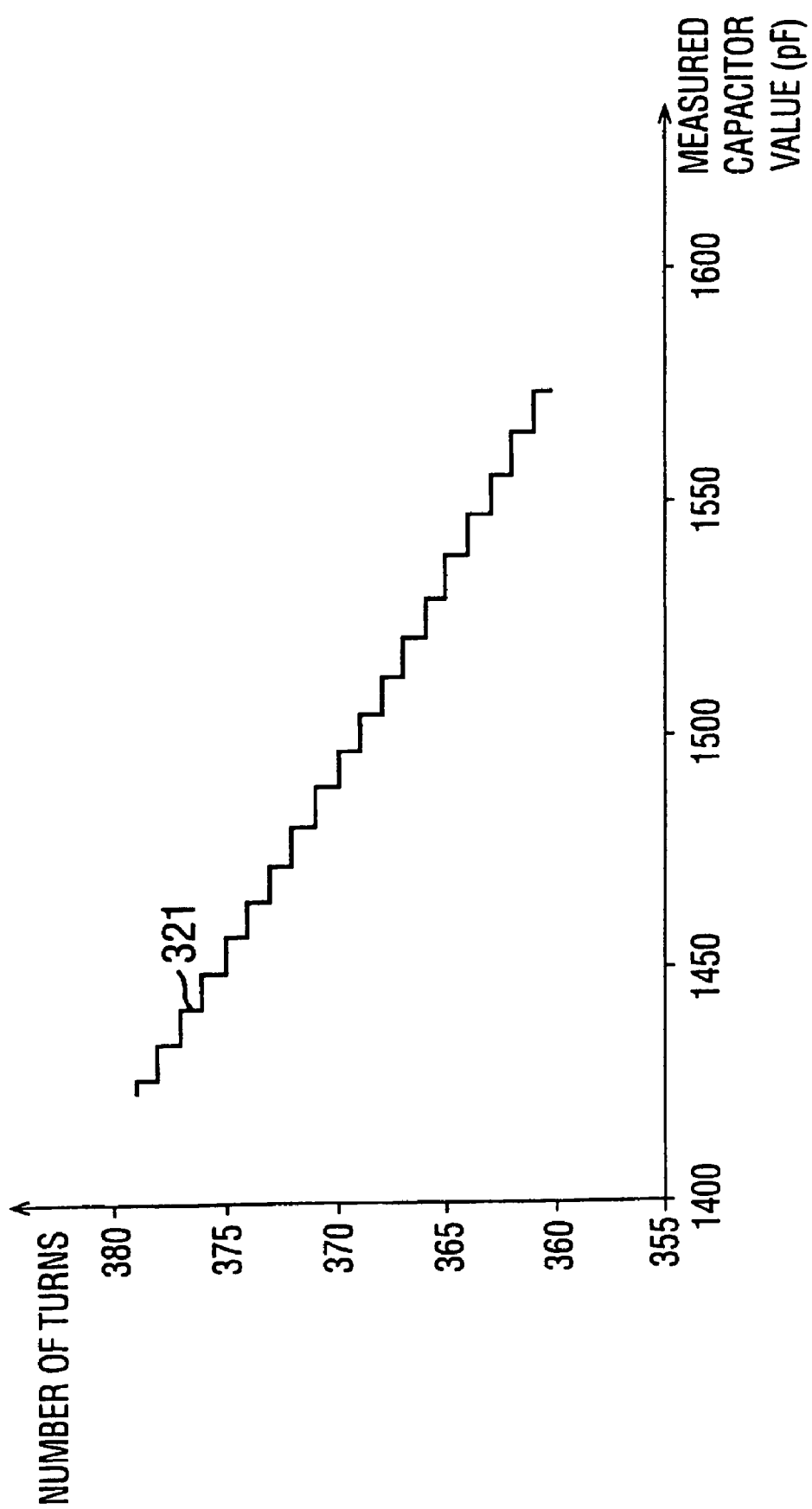
FIG. 20 is a plot illustrating the number of turns of conductor required on a coil forming part of the resonant stylus to maintain a given resonant frequency in dependence upon a measured value of the capacitance of a capacitor forming part of the resonant stylus.

As a further alternative, the coil 45 may be manufactured with a variable number of turns in order to compensate for the variability in other components such as the capacitor 43. For example, FIG. 19 illustrates a plot 325 which shows that the resonant frequency of the resonator 41 varies by +/−2.5% in response to a variation in the capacitor value of +/−5%. Therefore, if the number of coil turns is matched to the capacitor value, by first measuring the capacitor value and then matching it with a coil with an appropriate number of turns, the frequency variability can be reduced dramatically. For example, the number of coil turns may be specified from plot 321 illustrated in FIG. 20 and results in +/−0.15% frequency variability, as illustrated in plot 327 shown in FIG. 19. As those skilled in the art will appreciate, an automated machine may perform this selection process. A station of the machine would measure the capacitor's value and would send a signal to a coil winding station specifying how many turns to wind. On completion of the winding, the capacitor 43 would then be welded to the coil 45.

In the main embodiment described above, the rear body portion 154 maintains the coil 45 in position. As an alternative, the coil 45 may be fixed in place before the rear body portion 154 is fixed in position. For example, glue may be applied between the plastic sleeve 155 and the front body portion 152. In this case, the plastic sleeve 155 acts to prevent glue from flowing onto the ferrite rod 153 and fouling operation.

In the main embodiment described above, a two-stage pulse-echo measurement process was carried out. In the first stage, three excitation pulses were transmitted and the received signals were integrated over three excitation periods and in the second stage sixteen excitation pulses were transmitted and the received signals were integrated over sixteen excitation periods. As those skilled in the art will appreciate, the precise number of excitation periods and/or receive periods used may be varied depending on the system design. Further, it is not essential for the number of excitation periods to match the number of receive periods. It is also possible to vary the number of excitation periods without varying the number of receive periods between the first and second measurement stages. Similarly, it is possible to vary the number of receive periods over which the signals are integrated without varying the number of excitation periods during the two measurement stages.

In the above embodiment, the excitation and processing circuitry was formed in the same device as the excitation and sensor windings. As those skilled in the art will appreciate, the excitation and the processing circuitry may be provided on a remote body from the sensor windings. All that is required is that the resonant stylus be energised by an appropriate energising field and for the signals received in the sensor windings to be transmitted to the processing circuitry.

As those skilled in the art will appreciate, the excitation and processing techniques described above may be used with other types of windings and with other types of stylus, such as those described in U.S. Pat. No. 4,878,553. Similarly, the above-described stylus may be used with different types of windings such as those described in U.S. Pat. No. 4,878,553 or it can be used with other types of processing electronics.

In the main embodiment described above, the number of excitation pulses transmitted during the second measurement cycle was fixed at sixteen. In an alternative embodiment, the number of excitation pulses used in the second measurement cycle may be varied, depending on the results of the first measurement cycle. For example, if the processing electronics can determine the click state of the stylus from the signals of the first measurement cycle, the second measurement cycle may be adapted to transmit fewer excitation pulses, thereby saving power. If the system can determine the click state of the stylus from the first measurement cycle, then it is not necessary for the system to recalculate the click status of the pen from the signals received in the second measurement cycle. Similarly, if the system can determine the x,y position of the stylus from the signals in the first measurement cycle, then it is not necessary for the system to recalculate that position using the signals from the second measurement cycle. Further, as those skilled in the art will appreciate, if the processing electronics can determine both the resonator state and the resonator's position from the signals in the first measurement cycle, it is not essential to perform the second measurement cycle at all. In this case, an appropriate inhibiting signal may be output to the excitation and receive control unit to prevent the performance of the second measurement cycle.

In the above embodiment, the stylus was designed so that when pressure was applied to the nib of the stylus the resonant frequency increased. As those skilled in the art will appreciate, the stylus may be designed so that the resonant frequency decreases when pressure is applied to the nib. This may be achieved, for example, by placing the coil towards the rear end of the ferrite rod.

In the above embodiment, a biasing spring was provided towards the rear of the stylus. In an alternative embodiment, this spring may be replaced by a low force spring at the nib-end of the inductor coil. However, in such an embodiment, the spring may need to be made short and therefore of an undesirably thin wire diameter to ensure a low actuation force for the nib, which adds to the component cost and assembly difficulty. Further, the use of a metal spring at the nib end may adversely interfere with the resonator's magnetics. A plastic spring arrangement could be used instead, but this would be susceptible to creep over time, resulting in a loss of return force.

The above embodiment has described a hand-held personal digital assistant which employs a digitising system which is embedded behind the LCD of the device. As those skilled in the art will appreciate, the digitising system described above can be used for various applications. It is particularly useful, however, for low cost high volume consumer products such as PDAs, web browsers and mobile telephones and the like. FIG. 21 illustrates the way in which a mobile telephone 351 may be adapted to include a liquid crystal display 355 and underneath the display an x-y set of digitiser windings such as those described above which are operable to sense the position of a resonant stylus 357. The digitising system may be used to allow the user to create, for example, short text messages which can then be sent by the mobile telephone to another party. If the mobile telephone includes, for example, an organiser, then the digitiser can be used to control the inputting, manipulation and outputting of data from the organiser.

In the first embodiment, the digitiser system employed a number of sensor windings, an excitation winding and a resonant stylus. In an alternative embodiment, rather than using a resonant stylus, a stylus having either a short-circuit coil or a magnetic field concentrator (such as a piece of ferrite) could be used. However, in such embodiments, lower signal levels would be induced in the sensor windings and the system could not operate in the pulse-echo mode of operation since the non-resonant elements do not continue to "ring" after the excitation signal has ended. In a further alternative embodiment, rather than using a passive stylus, a powered stylus could be used with the sensor windings discussed above. In this case, since the stylus has power to generate its own magnetic field, there is no need for the excitation winding, although it may still be provided in order to give a phase reference signal to the stylus. The power to the stylus may be provided either by a battery contained within the stylus or by connecting the stylus, via a lead, to a power source. As those skilled in the art will appreciate, whilst such powered stylus embodiments are possible, they are not preferred since they increase the cost of the stylus and/or they require a lead to the stylus which interferes with the normal use of the device by the user.

In the above embodiment, a single resonant stylus was provided. As those skilled in the art will appreciate, the system may operate with multiple styluses having different resonant frequencies. Each stylus may then be assigned a different function in the system.

In the above embodiments, the ferrite core was mounted for movement with the tip and the coil was fixed to the housing. As those skilled in the art will appreciate, the stylus can operate with the ferrite core being fixed relative to the housing and the coil being mounted for movement with the tip. In such an embodiment, the washer would preferably be mounted for movement with the coil relative to the ferrite core. Various other modifications to the stylus will be apparent to those skilled in the art and will not be described further here.

In the above embodiment, a processing channel comprising two mixers and an integrator was provided for each sensor winding. In an alternative embodiment, a single processing channel may be used to process the signals induced in all the sensor windings in a time multiplexed manner. As those skilled in the art will appreciate, whilst this reduces the complexity of the processing electronics, it increases the time required to obtain a position measurement.

In the above embodiment, the sensor windings were arranged to have a sensitivity to magnetic field from the resonator which approximately varies as a single period of a sinusoid over the measurement range. As those skilled in the art will appreciate, the sensor windings may be arranged so that this sensitivity varies through multiple periods of a sinusoid. In this case, the system will have to keep track of the current period in which the resonant stylus is located. Examples of such multiperiod windings can be found in the applicant's earlier International Application WO98/58237. Another alternative is that the sensor windings are arranged so that their sensitivity to the magnetic field from the resonator varies through a fraction of a sinusoid over the measurement area. Such an embodiment is particularly useful in applications where the measurement area is rectangular, in order to ensure that the pitch of the x sensor windings and the y sensor windings are the same.

In the above embodiment, the excitation winding was used to energise the resonator and the signals received in the sensor windings were used to identify the resonator position. In an alternative embodiment, the sensor windings may be used to energise the resonator and the signals received on the excitation winding used to identify the location of the resonator. In such an embodiment, either the sensor windings would have to be energised in turn or if the sensor windings are energised together then separate excitation frequencies would have to be applied to each (which would require separate resonant circuits in the resonator which resonate at those frequencies) so that the processing electronics can distinguish the received signals. Alternatively still, the system could operate by energising the resonator using one of the sensor windings and then receiving the signal from the resonator on another sensor winding. The way that such a system can operate is described in the applicant's earlier International Application WO98/58237.

In the above embodiment, the excitation winding was wound around the outside of the sensor windings. In order to extend the measurement range of the sensor windings as far as possible towards the periphery of the sensor PCB, some of the turns of the excitation coil may alternatively be interlaced with the conductors of the sensor windings. This arrangement can also help maintain uniform outer coil field/sensitivity over the entire sensor board, which helps minimise the dynamic range of the sensor system and hence simplifies the design.

The sensor PCB which carries the excitation and sensor windings may be manufactured on a flexible printed circuit board. In this case, the connecting portion may be extended to form a flexible tail for connecting the coils to the processing electronics. A flexible PCB can also be used to minimise the thickness of the sensor board, e.g. to less than 0.2 mm.

As described above, each of the sensor windings comprises a number of primary sensing conductors and a number of connecting conductors for connecting the primary sensing conductors to each other. In the embodiment described above, the primary sensing conductors for the x-position sensor windings were located substantially in the y-direction whilst those for the y-position sensor windings extended substantially in the x-direction. As those skilled in the art will appreciate, this is not essential, the primary sensing conductors only have to cross the relevant measurement direction.

In the above embodiment, an electrostatic screen formed from a layer of carbon ink was provided between the sensor PCB and the backlight for the LCD. Other conductive layers may be used such as an evaporated aluminium film coating or a cross-hatched, fishbone or comb-shaped copper layer. Alternatively still, if the base of the electroluminescent backlight layer 11 can be grounded, then this can effectively act as the electrostatic screen instead.

In the above embodiment, a hand-held personal digital assistant has been described which employs a liquid crystal type display. As those skilled in the art will appreciate, the above digitiser system can be employed with other types of screen, such as TFT screens and the like.

In the above embodiment, the sensor PCB was located directly underneath the LCD of the hand-held PDA device. As those skilled in the art will appreciate, the sensor PCB does not have to be located underneath the LCD, it can, for example, be located to one side of it. However, if this is the case, then the overall size of the device will have to be larger.

In the above embodiment, each of the sensor windings was formed using multiple turns of conductor. As those skilled in the art will appreciate, the sensor windings can be formed using a single turn of conductor. However, this is not preferred, since the sensor winding's sensitivity to the magnetic field generated by the resonator is less sinusoidal and the signal levels output are smaller. It is therefore preferred to have as many turns as possible in the sensor windings.

In the main embodiment described above, most of the primary sensing conductors of each phase quadrature sensor winding have an irregular form with multiple bends along their length. As those skilled in the art will appreciate, this is not essential. In an alternative embodiment one of the phase quadrature windings may be a conventional type of winding having substantially parallel primary sensing conductors (such as those described in WO 00/33244), with the primary sensing conductors of the other phase quadrature winding having multiple bends along their length which are designed to compensate for the positional errors of the conventional winding.

In the above embodiment, sensor windings were used which were designed to have an approximate sinusoidal coupling with the resonant stylus, as a result of which the signals output from the sensor windings varied approximately sinusoidally with the position of the stylus relative to the windings. As those skilled in the art will appreciate, the approach taken to the design of the sensor windings described above is not limited to such "sinusoidal" windings. The technique can be used on any windings which produce an output signal which varies in a non-monotonic fashion with the position to be measured and in which two or more of such sensor windings are used to resolve the ambiguity caused by this non-monotonic characteristic of the windings by appropriate processing of the sensor signals by the processing electronics.

In the above embodiment, the signals induced in the sensor windings were mixed with the excitation signal and a 90° phase shifted version of the excitation signal in order to generate in phase and quadrature phase outputs, from which the electrical phase information of the resonator was determined. As those skilled in the art will appreciate, other techniques can be used in order to extract this resonator electrical phase information, such as the timing of zero crossings of the resonator signals, although this technique is not preferred because it is sensitive to noise. Further, if the sensed signals are to be mixed with phase offset mixing signals, it is not essential that the mixing signals be 90° out of phase. However, this is preferred since it simplifies the measurement of the electrical phase.

In the above embodiments, two-dimensional x-y digitising systems have been described. As those skilled in the art will appreciate, some aspects of the present invention are not, however, limited to two-dimensional position encoders. In particular, some aspects of the present invention can be incorporated into a one-dimensional linear or rotary position encoder. For example, the resonant stylus, the sensor windings or the processing electronics described above could be used in a linear position detector. Further, it is not essential to use multiple sensor windings. The signals from a single sensor winding may be used to determine both the electrical phase information and the position information.

In the above embodiments, the resonator was magnetically coupled to the excitation windings and the sensor windings. As those skilled in the art will appreciate, the above processing electronics may be used in systems where the excitation device and/or the sensing device are capacitively coupled to the resonator.

In the above embodiments, the signals output from the sensor windings were used and position measurements were obtained by performing an arc-tangent calculation. As those skilled in the art will appreciate, it is possible to extract the position information from the received signals without performing such an arc-tangent calculation. The applicant's earlier International Applications WO98/00921 or WO90/34171 disclose alternative techniques for determining the position information from the signals induced in the sensor windings.

In the above embodiments, two phase quadrature sensor windings in each of the x- and y-directions were used in order to generate signals which varied with position in phase quadrature to each other. As those skilled in the art will appreciate, this is not essential. As long as the windings are separated along the measurement axis by some non-zero or non-multiple of 180° phase shift, the signals induced in the sensor windings can be processed to extract the position information.

Various other modifications and alternative embodiments will be apparent to those skilled in the art.

What is claimed is:

1. A position indicator for use with a position detector, the position indicator comprising:
   a housing;
   a moveable nib extending from the housing and moveable relative to the housing between a retracted position and an extended position;
   a sensing coil;
   a flux linkage element which extends at least partially through the coil;
   wherein said sensing coil and said flux linkage element are mounted for relative movement with the movement of said nib, whereby the inductance of said coil is changed with the movement of said nib; and a magnetically permeable washer whose position is fixed relative to said sensing coil and which is arranged relative to the flux linkage element so that the distance between said washer and said flux linkage element varies with the movement of said nib relative to the housing.

2. A stylus for use with a position detector, the stylus comprising:

an elongate housing;

a moveable nib mounted at one end of the housing for axial movement relative thereto in a first direction from a retracted position to an extended position and in a second, opposite direction from the extended position to the retracted position;

a sensing coil;

a first flux linkage element which extends at least partially through the sensing coil;

wherein the sensing coil and the first flux linkage element are mounted for relative movement with the movement of said nib, whereby the inductance of said coil is changed with the movement of said nib; and a second flux linkage element whose position is fixed relative to said sensing coil and which is arranged relative to the first flux linkage element so that the distance between said first and second flux linkage elements varies with the movement of said nib relative to the housing;

wherein the nib comprises a shank with an enlarged head at one end and a tip at its other end, the head comprising a first axially facing abutment surface facing away from the tip; and wherein movement of the nib relative to the housing in said second direction is limited by said first abutment surface of said head coming into contact against a second abutment surface which is fixed within the housing.

3. A position indicator according to claim 1 wherein said washer has a non-circular central hole.

4. A position indicator according to claim 1, wherein said sensing coil is fixed within said housing, wherein a movement transmitting element is provided for transmitting movement of said nib to said flux linkage element so that said nib and said flux linkage element are slidably mounted within said housing and wherein said movement transmitting element is operable to act on said flux linkage element through a central hole of said washer.

5. A position indicator according to claim 4, wherein said movement transmitting element is formed integrally with said nib.

6. A position indicator according to claim 1, wherein said magnetically permeable washer is conductive.

7. A position indicator according to claim 1 further comprising a spring for spring biasing said nib in said extended position.

8. A position indicator according to claim 7, wherein said spring is operable to apply said spring biasing on said nib through said washer.

9. A stylus according to claim 2, wherein said enlarged head comprises a third axially facing abutment surface facing towards said tip, wherein the housing comprises a fourth axially facing abutment surface facing away from said tip and wherein movement of the nib relative to the housing in said first direction is limited by said third abutment surface butting against said fourth abutment surface.

10. A stylus according to claim 9, wherein said abutment surfaces are arranged so that the movement of said tip is less than 0.5 mm.

11. A stylus according to claim 9, further comprising a capacitor connected across the ends of said coil to form a resonant circuit, and wherein the movement of said tip changes the resonant frequency of said resonant circuit.

12. A stylus according to claim 11, wherein said change in resonant frequency is between 4% and 12% of said resonant frequency.

13. A stylus according to claim 2, wherein said sensing coil is fixed within said housing and wherein said stylus further comprises a movement transmitting element for transmitting movement of said nib to said first flux linkage element.

14. A stylus according to claim 13, wherein said movement transmitting element is integrally formed with said enlarged head of said nib.

15. A stylus according to claim 13, wherein said second flux linkage element is a magnetic washer whose position is fixed relative to said coil and wherein said movement transmitting element is operable to act on said first flux linkage element through a central hole of said washer.

16. A stylus according to claim 15, wherein said washer comprises a magnetically permeable material.

17. A stylus according to claim 2, further comprising a spring for spring-biasing said nib in said extended position.

18. A stylus according to claim 17, wherein the biasing force of said spring acts on said nib through said first flux linkage element.

* * * * *